United States Patent
Liu et al.

(10) Patent No.: US 10,430,446 B2
(45) Date of Patent: Oct. 1, 2019

(54) SEMANTIC REVERSE SEARCH INDEXING OF PUBLICATION CORPUS

(71) Applicant: eBay Inc., San Jose, CA (US)

(72) Inventors: Mingkuan Liu, San Jose, CA (US); Hao Zhang, San Jose, CA (US); Xianjing Liu, San Jose, CA (US); Alan Qing Lu, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 226 days.

(21) Appl. No.: 15/439,026

(22) Filed: Feb. 22, 2017

(65) Prior Publication Data

US 2018/0052908 A1    Feb. 22, 2018

Related U.S. Application Data

(60) Provisional application No. 62/375,835, filed on Aug. 16, 2016.

(51) Int. Cl.
*G06F 17/30* (2006.01)
*G06F 16/31* (2019.01)
*G06N 3/04* (2006.01)

(52) U.S. Cl.
CPC ......... *G06F 16/316* (2019.01); *G06N 3/0454* (2013.01)

(58) Field of Classification Search
USPC .................................. 707/761, 744
See application file for complete search history.

(56) References Cited

U.S. PATENT DOCUMENTS

2012/0233127 A1* 9/2012 Solmer .................. G06F 16/93
                                                     707/661
2016/0042296 A1* 2/2016 Shan .................... G06F 16/3329
                                                     706/11

* cited by examiner

*Primary Examiner* — Hung T Vy
(74) *Attorney, Agent, or Firm* — Shook, Hardy & Bacon L.L.P.

(57) ABSTRACT

Embodiments of the present disclosure relate generally to semantic indexing to improve search results of a large corpus. Some embodiments, with at least one of the keywords of the search query encoded by a semantic vector in a semantic vector space, identify a plurality of candidate publications in the publication corpus, the plurality of candidate publications encoded by a cluster of a plurality of semantic vectors in the semantic vector space, the identifying based on proximity in the semantic vector space between the at least one of the keywords of the search query and keywords in the plurality of candidate publications, the proximity based on a first machine-learned model that projects the at least one keyword in the search query and the keywords in the plurality of candidate publications into the semantic vector space.

15 Claims, 15 Drawing Sheets

US 10,430,446 B2

SEMANTIC REVERSE SEARCH INDEXING OF PUBLICATION CORPUS

RELATED APPLICATION(S)

This application claims the benefit of priority under 35 U.S.C. 119(e) to Provisional Application No. 62/375,835, filed Aug. 16, 2016 and entitled "SEMANTIC REVERSE SEARCH INDEXING OF PUBLICATION CORPUS," which is incorporated herein by reference in its entirety.

TECHNICAL FIELD

Embodiments of the present disclosure relate generally to semantic indexing to improve search results of a large corpus.

BACKGROUND

Present indexing techniques do not index a corpus based on semantic meaning. This results in search results failing to be comprehensive.

BRIEF DESCRIPTION OF THE DRAWINGS

Various ones of the appended drawings merely illustrate example embodiments of the present disclosure and cannot be considered as limiting its scope.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Some embodiments, with at least one of the keywords of the search query encoded by a semantic vector in a semantic vector space, identify a plurality of candidate publications in the publication corpus, the plurality of candidate publications encoded by a cluster of a plurality of semantic vectors in the semantic vector space, the identifying based on proximity in the semantic vector space between the at least one of the keywords of the search query and keywords in the plurality of candidate publications, the proximity based on a first machine-learned model that projects the at least one keyword in the search query and the keywords in the plurality of candidate publications into the semantic vector space. Because the identification is based on semantic meaning, search results are more comprehensive.

Figure 1:
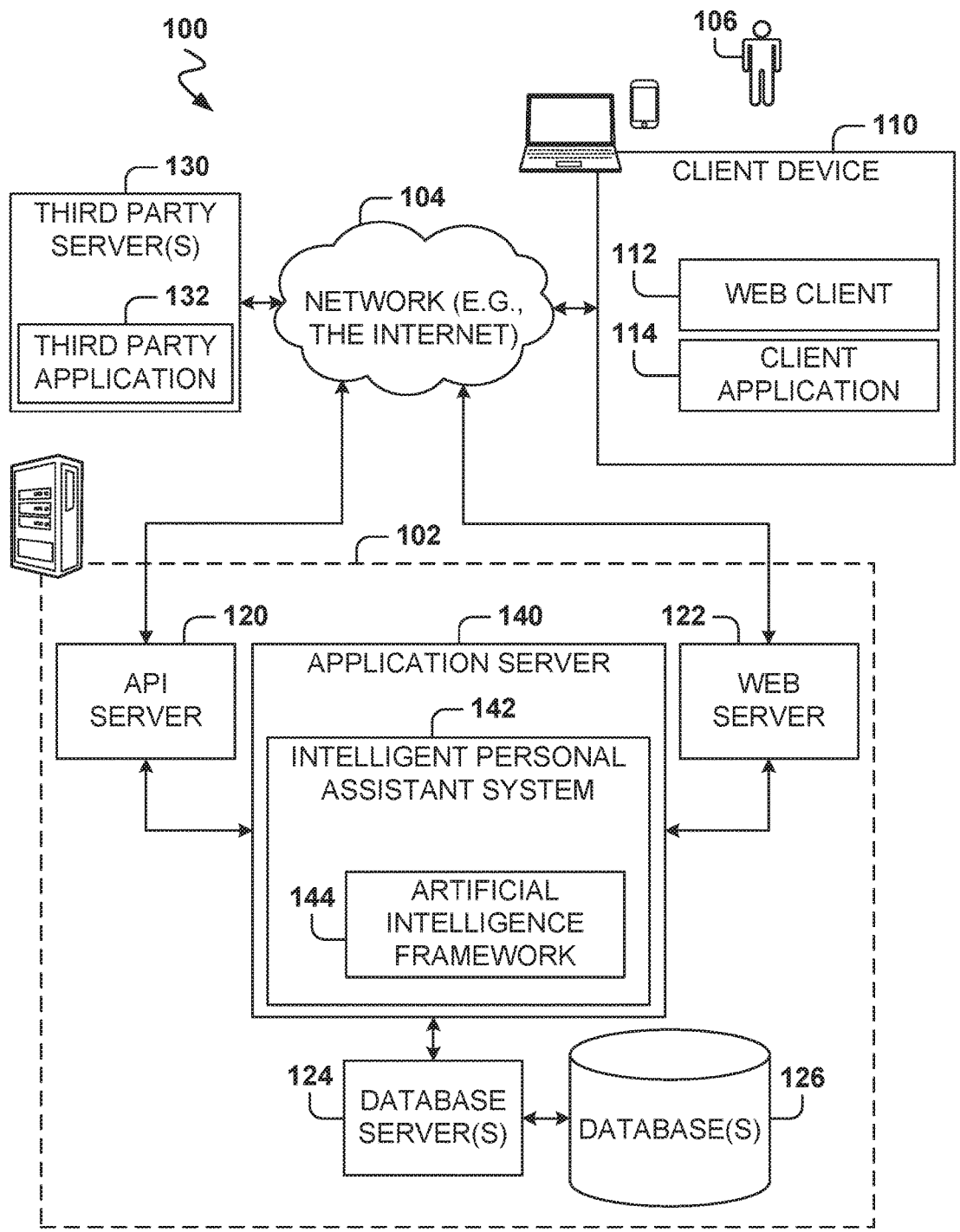
FIG. 1 is a block diagram illustrating a networked system, according to some example embodiments.

FIG. 1 is a block diagram illustrating a networked system, according to some example embodiments. With reference to FIG. 1, an example embodiment of a high-level client-server-based network architecture 100 is shown. A networked system 102, in the example forms of a network-based publication system, provides server-side functionality via a network 104 (e.g., the Internet or wide area network (WAN)) to one or more client devices 110. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks. The client device 110 may comprise, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. The client device 110 may be a device of a user that is used to perform a transaction involving digital publications within the networked system 102. In one embodiment, the networked system 102 is a network-based publication system that responds to requests for listings or publications and publishes publications. Examples of publications are item listings for sale.

Each of the client device 110 may include one or more applications (also referred to as "apps") such as, but not limited to, a web browser, messaging application, electronic mail (email) application, an e-commerce site application (also referred to as a marketplace application), and the like. FIG. 1 illustrates, for example, a web client 112 (e.g., a browser, such as the Internet Explorer® browser developed by Microsoft® Corporation of Redmond, Wash. State), an application 114, and a programmatic client (not shown) executing on the client device 110. The web client 112 may access an intelligent personal assistant system 142 via the web interface supported by the web server 122. Similarly, the programmatic client accesses the various services and functions provided by the intelligent personal assistant system 142 via the programmatic interface provided by the API server 120.

In some embodiments, if the e-commerce site application is included in a given one of the client device 110, then this application is configured to locally provide the user interface and at least some of the functionalities with the application configured to communicate with the networked system 102, on an as needed basis, for data or processing capabilities not locally available (e.g., access to a publication database of items available for sale, to authenticate a user, to verify a method of payment). Conversely if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user. In this way, the user 106 can interact with the networked system 102 using the client device 110.

An application program interface (API) server 120 and a web server 122 are coupled to, and provide programmatic and web interfaces respectively to, one or more application servers 140. The application server 140 host an intelligent personal assistant system 142, which includes an artificial intelligence framework 144, each of which may comprise one or more modules or applications and each of which may be embodied as hardware, software, firmware, or any combination thereof.

The application server 140 is, in turn, shown to be coupled to one or more database servers 124 that facilitate access to one or more information storage repositories or databases 126. In an example embodiment, the databases 126 are storage devices that store information to be posted (e.g., publications or listings) to a publication system (not shown). The databases 126 may also store digital publication information in accordance with example embodiments.

Additionally, a third-party application 132, executing on third-party servers 130, is shown as having programmatic access to the networked system 102 via the programmatic interface provided by the API server 120. For example, the third-party application 132, utilizing information retrieved from the networked system 102, supports one or more features or functions on a website hosted by the third party. The third-party website, for example, provides one or more functions that are supported by the relevant applications of the networked system 102.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The intelligent personal assistant system 142 can also be implemented as a standalone system, which does not necessarily have networking capabilities.

Figure 2:
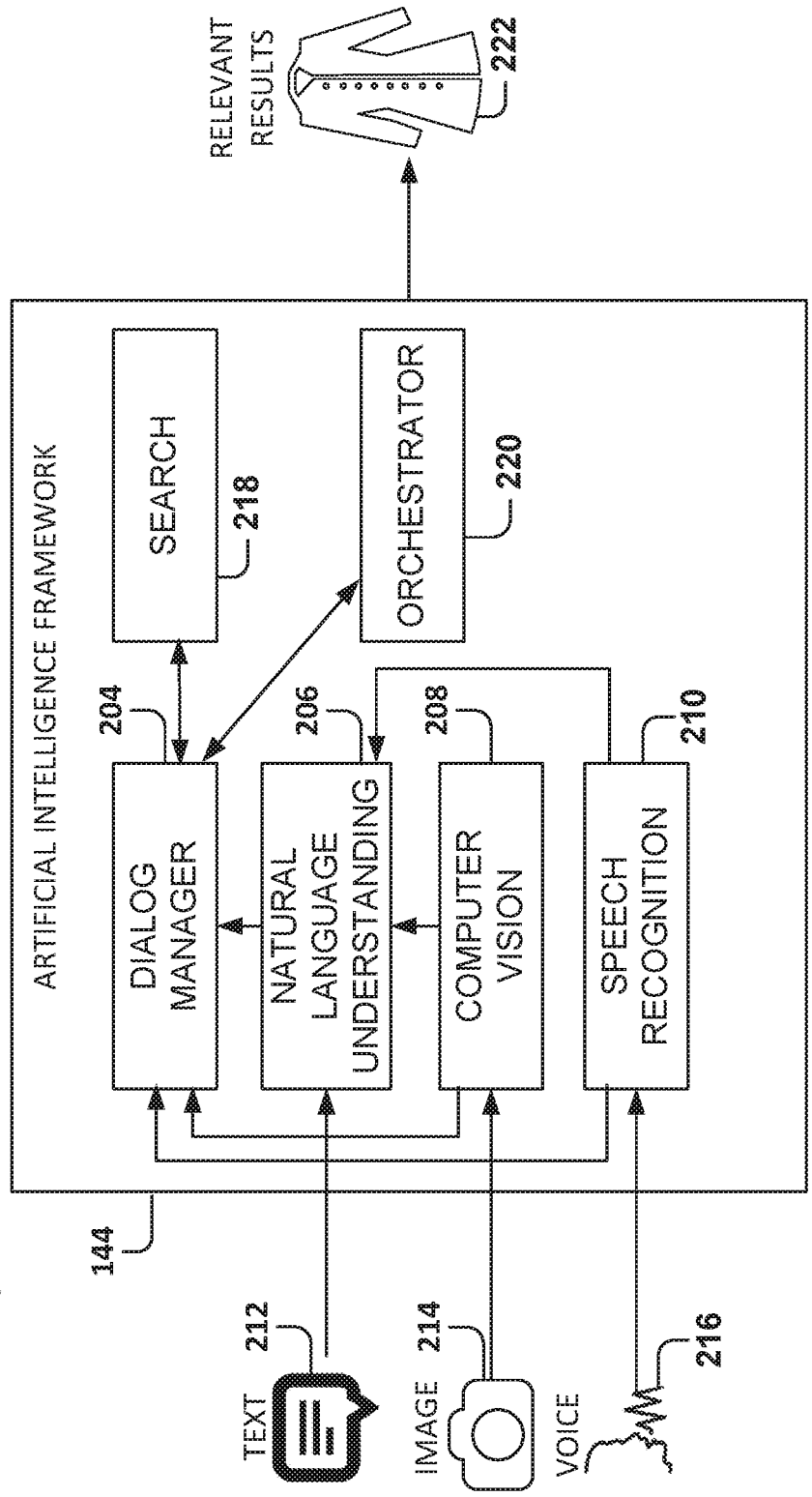
FIG. 2 is a block diagram illustrating operation of the intelligent assistant, according to some example embodiments.

FIG. 2 is a diagram illustrating the operation of the intelligent assistant 142, according to some example embodiments. Conventionally, one cannot really perform a search using natural language. For example, today's online shopping is impersonal, unidirectional, and keyword-based, which is inadequate for buyers to express their exact intent, and is much harder compared to shopping in a store with the assistance of a helpful salesperson.

Example embodiments present a personal assistant, also referred to as an intelligent assistant, that supports human-like dialog with the user, enabling delivery of more relevant and personalized search results. The natural, human-like experience increases the likelihood that the user will reuse the intelligent assistant for future searches.

The artificial intelligence framework 144 understands the user and the available publications (e.g., inventory) to respond to natural-language queries and has the ability to deliver incremental improvements in anticipating and understanding the user and the user's needs.

The artificial intelligence framework (AIF) 144 includes a dialogue manager 204, natural language understanding (NLU) 206, computer vision 208, speech recognition 210 module, search module 218, and orchestrator 220. The AIF 144 is able to receive different kinds of inputs, such as text input 212, image input 214, voice input 216, or any combination of the three, to generate relevant results 222. As used herein, the AIF 144 includes a plurality of services (e.g., NLU 206, computer vision 208) that are implemented by corresponding servers, and the terms service or server may be utilized to identify the service and the corresponding server.

A natural language understanding (NLU) 206 unit processes natural language text input 212, both formal and informal language, detects the intent of the text, and extracts (e.g., parses) useful information, such as objects of interest and their attributes. The natural language text input 212 can thus be transformed into a structured query using rich information from additional knowledge to enrich the query even further. This information is then passed on to the dialog manager 204 through the orchestrator 220 for further actions with the user or with the other components in the overall system. The structured and enriched query is also consumed by the search 218 for improved matching. The text input 212 may be a query for a publication, a refinement to a previous query (e.g., size of shoes).

The computer vision 208 takes an image as an input and performs image recognition to identify characteristics of the image (e.g., object the user wants to search for), which are then transferred to the NLU 206 for processing. Similarly, the speech recognition 210 takes the speech 216 as an input and performs language recognition to convert speech to text, which is then transferred to the NLU 206 for processing.

The NLU 206 determines the object, the aspects associated with the object, how to create the search interface input, and how to generate the response. For example, the AIF 144 may ask questions to the user to clarify what the user is looking for. This means that the AIF 144 not only generates results, but also may create a series of interactive operations to get to relevant results 222.

For example, in response to the query, "Can you find me a pair of red Nike shoes?" the AIF 144 may generate the following parameters: <intent:shopping, statement-type: question, dominant-object:shoes, target:self, color:red, brand:nike>. To the query, "I am looking for a pair of sunglasses for my wife," the NLU may generate <intent: shopping, statement-type:statement, dominant-object:sunglasses, target:wife, target-gender:female>. In other example embodiments, digital embedding of image or voice data can be used directly, or in addition to text extraction, for search.

The dialogue manager 204 is the module that analyzes the query of a user to extract meaning, and determines if there is a question that needs to be asked in order to refine the query, before sending the query to the search 218. The dialogue manager 204 uses the current communication in context of any previous communication between the user and the artificial intelligence framework 144. The questions are automatically generated dependent on the combination of the accumulated knowledge (e.g., provided by a knowledge graph) and what the search 218 can extract out of the inventory. The dialogue manager 204 creates a response for the user. For example, if the user says, "hello," the dialogue manager 204 generates a response, "Hi, my name is bot." The dialogue manager 204 pulls predetermined responses from a database or table that correlates the input "hello" to the predetermined responses, or generate a response from a machine-learned model.

The orchestrator 220 coordinates the interactions between the other services within the artificial intelligence framework 144. More details are provided below regarding the interactions of the orchestrator 220 with other services with reference to FIG. 5.

Figure 3:
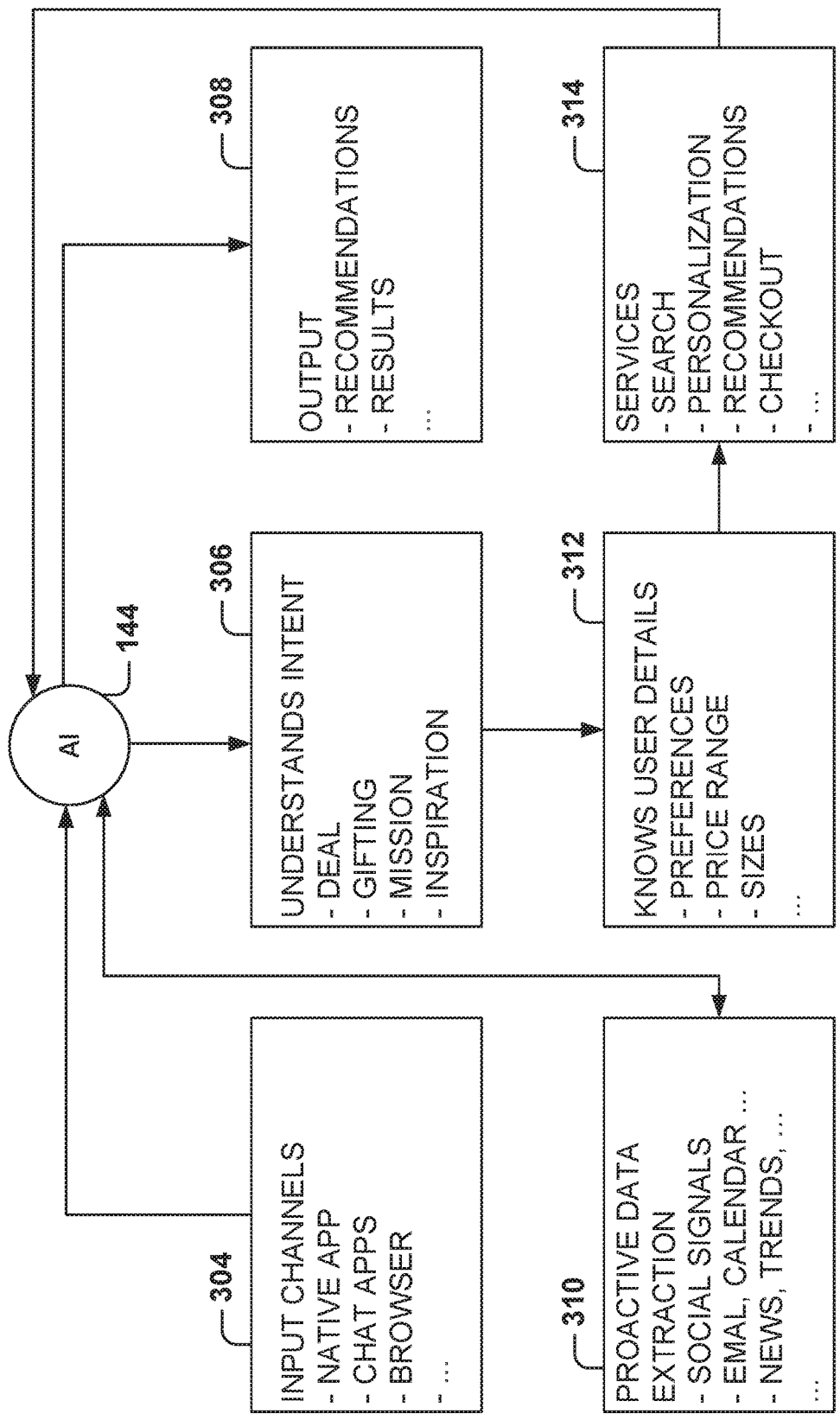
FIG. 3 illustrates features of an artificial intelligence (AI) framework, according to some example embodiments.

FIG. 3 illustrates the features of the artificial intelligence framework (AIF) 144, according to some example embodiments. The AIF 144 is able to interact with several input channels 304, such as native commerce applications, chat applications, social networks, browsers, etc. In addition, the AIF 144 understands intent 306 expressed by the user. For example, the intent 306 may include a user looking for a good deal, a user looking for a gift, a user on a mission to buy a specific product, a user looking for suggestions, etc.

Further, the AIF 144 performs proactive data extraction 310 from multiple sources, such as social networks, email, calendar, news, market trends, etc. The AIF 144 knows or has access to user details 312, such as user preferences, desired price ranges, sizes, affinities, etc. The AIF 144 facilitates a plurality of services within the service network, such as search, recommendations, user profile/preference learning, checkout, etc. An output 308 may include search results, recommendations, checkout confirmation, etc.

The AIF 144 is an intelligent and friendly system that understands the user's intent (e.g., targeted search, compare, shop, browse), mandatory publication parameters (e.g., product, product category, item), optional publication parameters (e.g., aspects of the item, color, size, occasion), as well as implicit information (e.g., geo location, personal preferences, age, gender). The AIF 144 responds with a well-designed response in natural language.

For example, the AIF 144 may process input queries, such as: "Hey! Can you help me find a pair of light pink shoes for my girlfriend please? With heels. Up to $200. Thanks;" "I recently searched for a men's leather jacket with a classic James Dean look. Think almost Harrison Ford's in the new Star Wars movie. However, I'm looking for quality in a price range of $200-300. Might not be possible, but I wanted to see!;" or "I'm looking for a black Northface Thermoball jacket."

Instead of a hardcoded system, the AIF 144 provides a configurable, flexible interface with machine learning capabilities for ongoing improvement. The AIF 144 supports a publication system that provides ease of use, value (e.g., connecting the user to the things that the user wants), intelligence (e.g., knowing and learning from the user and the user behavior to recommend the right publications), convenience (e.g., offering a plurality of user interfaces), and efficiency (e.g., saves the user time and money).

Figure 4:
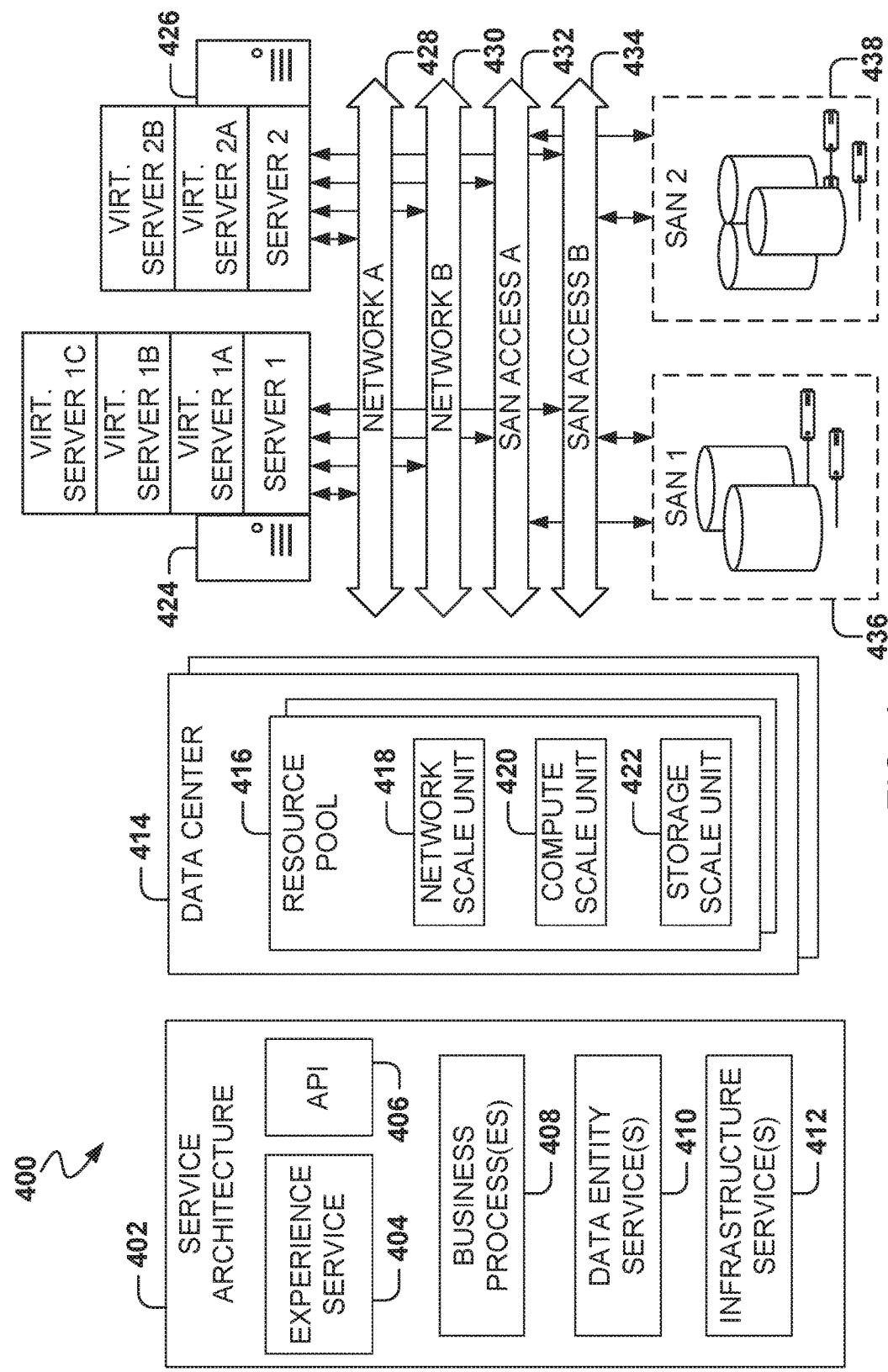
FIG. 4 is a diagram illustrating a service architecture according to some example embodiments.

FIG. 4 is a diagram illustrating a service architecture environment 400 according to some embodiments. The service architecture environment 400 presents various views of the service architecture in order to describe how the service architecture may be deployed on various data centers or cloud services. The service architecture environment 400 represents a suitable environment for implementation of the embodiments described herein.

A service architecture 402 represents how a cloud architecture typically appears to a user, developer, and so forth. The service architecture 402 is generally an abstracted representation of the actual underlying architecture implementation, represented in the other views of FIG. 1. For example, the service architecture 402 comprises a plurality of layers that represent different functionality and/or services associated with the service architecture 402.

An experience service layer 404 represents a logical grouping of services and features from an end user's point of view, built across different client platforms, such as applications running on a platform (e.g., mobile phone, desktop), web based presentation (e.g., mobile web, desktop web browser), and so forth. The experience service layer 404 includes rendering user interfaces and providing information to the client platform so that appropriate user interfaces can be rendered, capturing client input, and so forth. In the context of a marketplace, examples of services that would reside in this layer include, for example, a home page (e.g., home view), view publication, search/view search results, shopping cart, buying user interface and related services, selling user interface and related services, after sale experiences (e.g., posting a transaction, feedback), and so forth. In the context of other systems, the experience service layer 404 incorporates those end user services and experiences that are embodied by the system.

An API layer 406 contains APIs which allow interaction with business process and core layers. This allows third party development against the service architecture 402 and allows third parties to develop additional services on top of the service architecture 402.

A business process service layer 408 is where the business logic resides for the services provided. In the context of a marketplace, this is where services such as user registration, user sign in, listing creation and publication, add to shopping cart, place an offer, checkout, send invoice, print labels, ship item, return item, and so forth are implemented. The business process service layer 408 also orchestrates between various business logic and data entities and thus represents a composition of shared services. The business processes in this layer can also support multi-tenancy in order to increase compatibility with some cloud service architectures.

A data entity service layer 410 enforces isolation around direct data access and contains the services upon which higher level layers depend. Thus, in the marketplace context, this layer comprises underlying services like order management, financial institution management, user account services, and so forth. The services in this layer typically support multi-tenancy.

An infrastructure service layer 412 comprises those services that are not specific to the type of service architecture being implemented. Thus, in the context of a marketplace, the services in this layer are services that are not specific or unique to a marketplace. Thus, functions like cryptographic functions, key management, CAPTCHA, authentication and authorization, configuration management, logging, tracking, documentation and management, and so forth reside in this layer.

Embodiments of the present disclosure will typically be implemented in one or more of these layers, such as the AIF 144, as well as the orchestrator 220 and the other services of the AIF 144.

A data center 414 is a representation of various resource pools 416 along with their constituent scale units. The data center 414 representation illustrates the scaling and elasticity that comes with implementing the service architecture 402 in a cloud computing model. The resource pool 416 is comprised of server (or compute) scale units 420, network scale units 418 and storage scale units 422. A scale unit is a server, network, or storage unit that is the smallest unit capable of deployment within the data center. The scale units 418, 420, and 422 allow for more capacity to be deployed or removed as the need increases or decreases.

The network scale unit 418 contains one or more networks (e.g., network interface units) that can be deployed. The networks can include, for example virtual LANs. The compute scale unit 420 typically comprise a unit (e.g., server) that contains a plurality processing units, such as processors. The storage scale unit 422 contains one or more storage devices such as disks, storage attached networks (SAN), network attached storage (NAS) devices, and so forth. These are collectively illustrated as SANs in the description below. Each SAN may comprise one or more volumes, disks, and so forth.

The remainder of FIG. 4 illustrates another example of a service architecture environment 400. This view is more hardware focused and illustrates the resources underlying the more logical architecture in the other views of FIG. 4. A cloud computing architecture typically has a plurality of servers or other systems 424, 426. These servers comprise a plurality of real or virtual servers. Thus the server 424 comprises server 1 along with virtual servers 1A, 1B, 1C and so forth.

The servers are coupled to or interconnected by one or more networks such as network A 428 or network B 430. The servers are also coupled to a plurality of storage devices, such as SAN 1 (436), SAN 2 (438) and so forth. SANs are typically coupled to the servers through a network such as SAN access A 432 or SAN access B 434.

The compute scale units 420 are typically some aspect of servers 424 or 426, like processors, and other hardware associated therewith. The network scale units 418 typically include, or at least utilize, the illustrated networks A (428) and B (432). The storage scale units typically include some aspect of SAN 1 (436) or SAN 2 (438). Thus, the logical service architecture 402 can be mapped to the physical architecture.

Services and other implementation of the embodiments described herein will run on the servers or virtual servers and utilize the various hardware resources to implement the disclosed embodiments.

In various embodiments a machine-learned model encodes a search query or a portion of a search query into a continuous, dimensional vector space where semantic level similar sequences will have closer representation in this vector space. This machine-learned model approach can automatically capture the deep latent semantic meaning of a publication title, a search query, a portion of a publication title, or a portion of a search query and project its semantic level meaning into a shared multi-dimensional vector space. Such a model can be adapted to encode additional information such as user profile and session context on the input side, and other publication attributes on the inventory side.

Deep learning has recently shown much promise in Natural Language Processing (NLP). NLP researchers in this area are trying various ways to encode a sequence of symbols (e.g., phrases, sentences, paragraphs, and documents) into a multi-dimensional vector space, called semantic space. Semantic level similar sequences will have closer representation in this multi-dimensional space. Research in this area has led to an adoption of vector space representations of sentences instead of just words. Generally, phrases or sentences better define the contextual information rather than a single word. In various embodiments, research in sentence embedding is leveraged to recommend publications of a seller on a publication system.

In an example embodiment, a machine-learned model is used to embed the deep latent semantic meaning of a given publication title and project it to a shared semantic vector space. A vector space can be referred to as a collection of objects called vectors. Vectors spaces can be characterized by their dimension, which specifies the number of independent directions in the space. A semantic vector space can represent phrases and sentences and can capture semantics for NLP tasks. In further embodiments, a semantic vector space can represent audio sounds, phrases, or music; video clips; and images and can capture semantics for NLP tasks.

In various embodiments, machine learning is used to maximize the similarity between the source (X), for example, a publication title, and the target (Y), the search query. A machine-learned model may be based on deep neural networks (DNN) or convolutional neural networks (CNN). The DNN is an artificial neural network with multiple hidden layers of units between the input and output layers. The DNN can apply the deep learning architecture to recurrent neural networks. The CNN is composed of one or more convolution layers with fully connected layers (such as those matching a typical artificial neural network) on top. The CNN also uses tied weights and pooling layers. Both the DNN and CNN can be trained with a standard back propagation algorithm.

Figure 5:
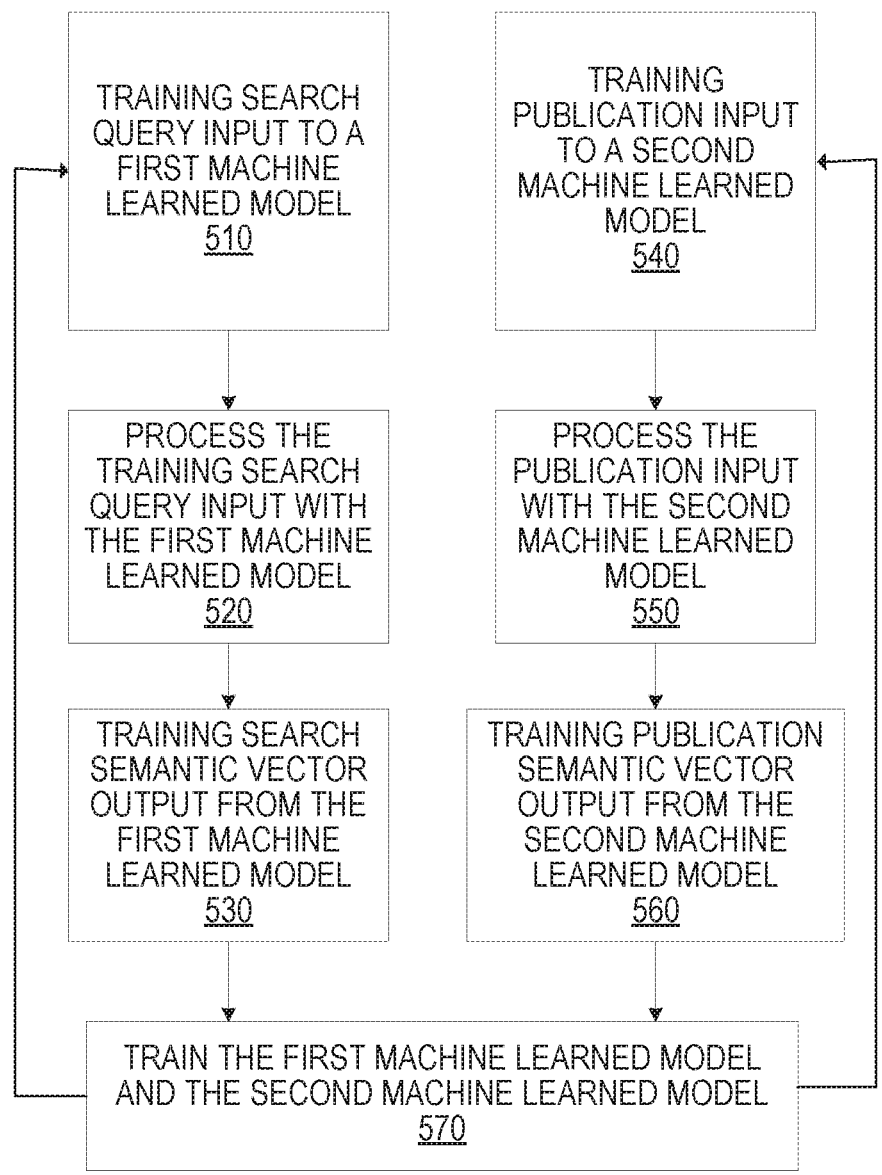
FIG. 5 illustrates a flow diagram of a method for training semantic machine learned models.

FIG. 5 illustrates a flow diagram of a method for training semantic machine learned models.

When a machine-learned model is applied to mapping a specific <source, target> pair, the parameters for machine-learned Source Model and machine-learned Target Model are optimized so that relevant <source, target> pair has closer vector representation distance. The following formula can be used to compute the minimum distance.

$$SrcMod^*, TgtMod^* = \operatorname*{argmin}_{k \text{ in all training pairs}} \sum \|SrcVec^k - TgtVec^k\|$$

Where,
ScrSeq=a source sequence;
TgtSeq=a target sequence;
SrcMod=source machine-learned model;
TgtMod=target machine-learned model;
SrcVec=a continuous vector representation for a source sequence (also referred to the semantic vector of the source); and
TgtVec=a continuous vector representation for a target sequence (also referred to as semantic vector of the target).

The source machine-learned model encodes the source sequence into a continuous vector representation. The target machine-learned model encodes the target sequence into a continuous vector representation. In an example embodiment, the vectors each have approximately 100 dimensions.

In other embodiments, any number of dimensions may be used. In example embodiments, the dimensions of the semantic vectors are stored in a KD tree structure. The KD tree structure can be referred to a space-partitioning data structure for organizing points in a KD space. The KD tree can be used to perform the nearest-neighbor lookup. Thus, given a source point in space, the nearest-neighbor lookup may be used to identify the closest point to the source point.

In FIG. 5, the left column is directed to training a machine learned model on search queries. In operation 510, a training search query is input to a first machine learned model. In operation 520, the training search query is processed by the first machine learned model of the neural network. In operation 530, the first machine learned model outputs a training semantic search vector.

In FIG. 5, the right column is directed to training a machine learned model on publications. In operation 540, a training publication is input to a second machine learned model. In operation 550, the training publication is processed by the second machine learned model of the neural network. In operation 560, the second machine learned model outputs a training publication semantic vector.

In operation 570, the training semantic search vector and the training publication semantic vector are compared to adjust the first machine learned model and the second machine learned model, such that semantically similar training search queries and training publications result in respective semantic vectors that are proximate, and such that semantically dissimilar training search queries and training publications result in respective semantic vectors that are not proximate.

Figure 6:
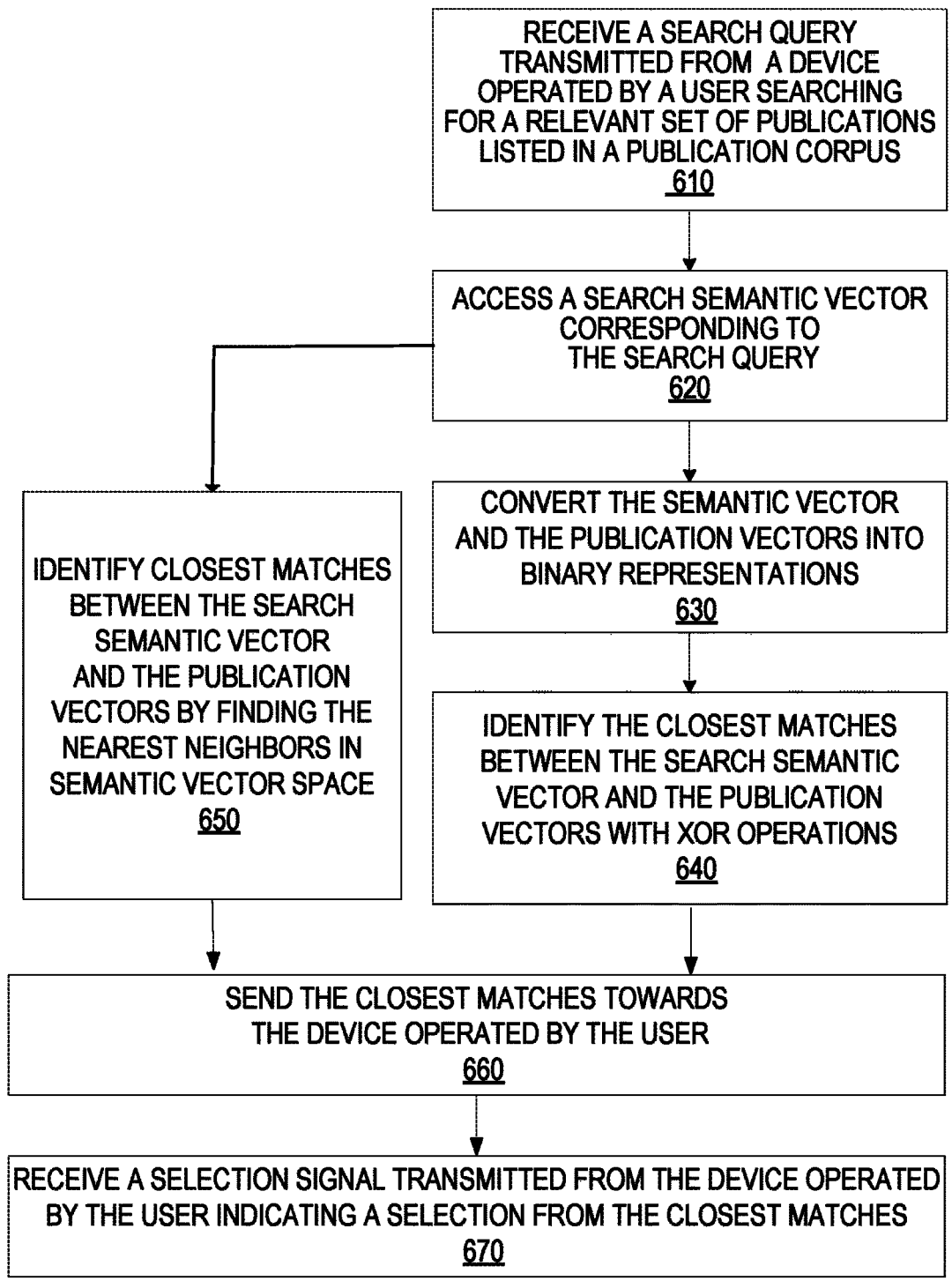
FIG. 6 illustrates a flow diagram of a method for using a forward semantic search index to find closest matches in a publication corpus in response to a user search.

FIG. 6 illustrates a flow diagram for using a forward semantic search index to find closest matches in a publication corpus in response to a user search.

In operation 610, a search query is received which is received from a device operated by a user searching for a publication listed in a publication corpus. In operation 620, a semantic search vector is accessed that encodes the search query, such that the semantic search vector represents the semantic meaning of the search query. The semantic search vector is pre-generated and just accessed in one embodiment. In another embodiment, the semantic search vector is generated and then accessed. The semantic search vector is based on the entire search query, multiple terms of the search query, or a single term in the event of short search queries.

Alternative paths exist for finding the closest matches between search queries and publications. In operation 630, the semantic search vector and publication vector are converted into binary representations. In operation 640, the closest matches are identified between the binary representations via XOR operations (which can be XOR or XNOR operations). In another embodiment, the semantic search vector or the publication vector are formed as binary representations to make the binary conversion superfluous. Alternatively in operation 650, closest matches are identified in a non-binary representation such as a floating point. In one embodiment, operation 650 gives higher quality results as operation 630 is not a lossless conversion. In one embodiment, operations 630-640 have sufficiently good results with a lower (and feasible) latency.

In operation 660, the closest matches are sent to the device operated by the user, and in some embodiments are displayed on the device. In operation 670, a selection signal is received, which is transmitted from the device operated by the user indicating a selection from the closest matches.

Figure 7:
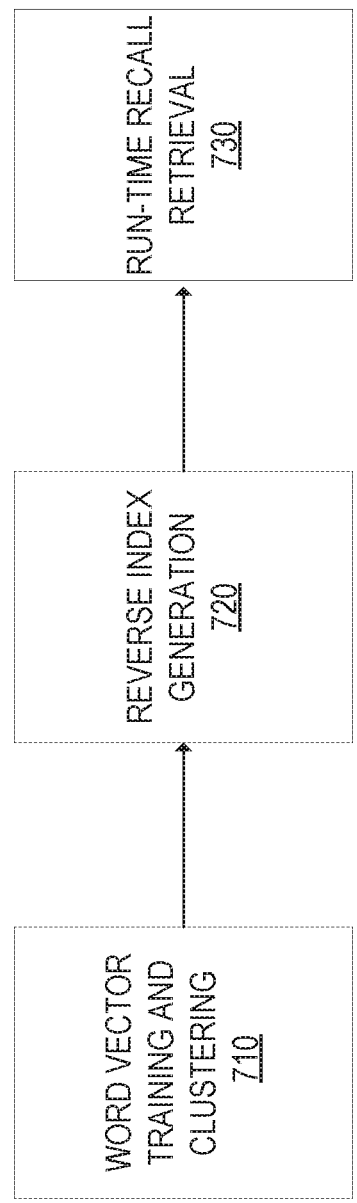
FIG. 7 illustrates a block diagram of a method for making and using a reverse semantic search index to find closest matches in a publication corpus in response to a user search.

FIG. 7 illustrates a block diagram of making and using a reverse semantic search index to find closest matches in a publication corpus in response to a user search. FIG. 7 shows word vector training and clustering 710, reverse index generation 720, and run-time recall retrieval 730.

A word vector based reverse-indexing approach captures various synonyms for a search query but without the costly requirement of maintaining a big synonym dictionary for every possible keyword. Keywords in the search query and publications are converted into semantic vectors. Those semantic vectors are grouped into a finite number of clusters in word vector training and clustering 710 and then used in reverse index generation 720. Based on those clusters of semantic vectors, a list of publications are fetched based on any search query in run-time recall retrieval 730.

In contrast with FIG. 6, in FIG. 7 the semantic vector is a vector representing a single keyword in a search query or publication. For example, a search query "red namebrand shoes" has a single semantic vector [1.0, 2.4. 3.0]. While it has 3 different word vectors: "red" has a semantic vector of [3.2, 1.1, 0.5], "namebrand" has semantic vector of [−0.3, 2.6, 1.1], and "shoes" has a semantic vector of [1.3, 2.4, 3.5]. In other embodiments, the semantic vector is a vector representing multiple keywords in a search query or publication, but less than the whole search query or publication.

Figure 8:
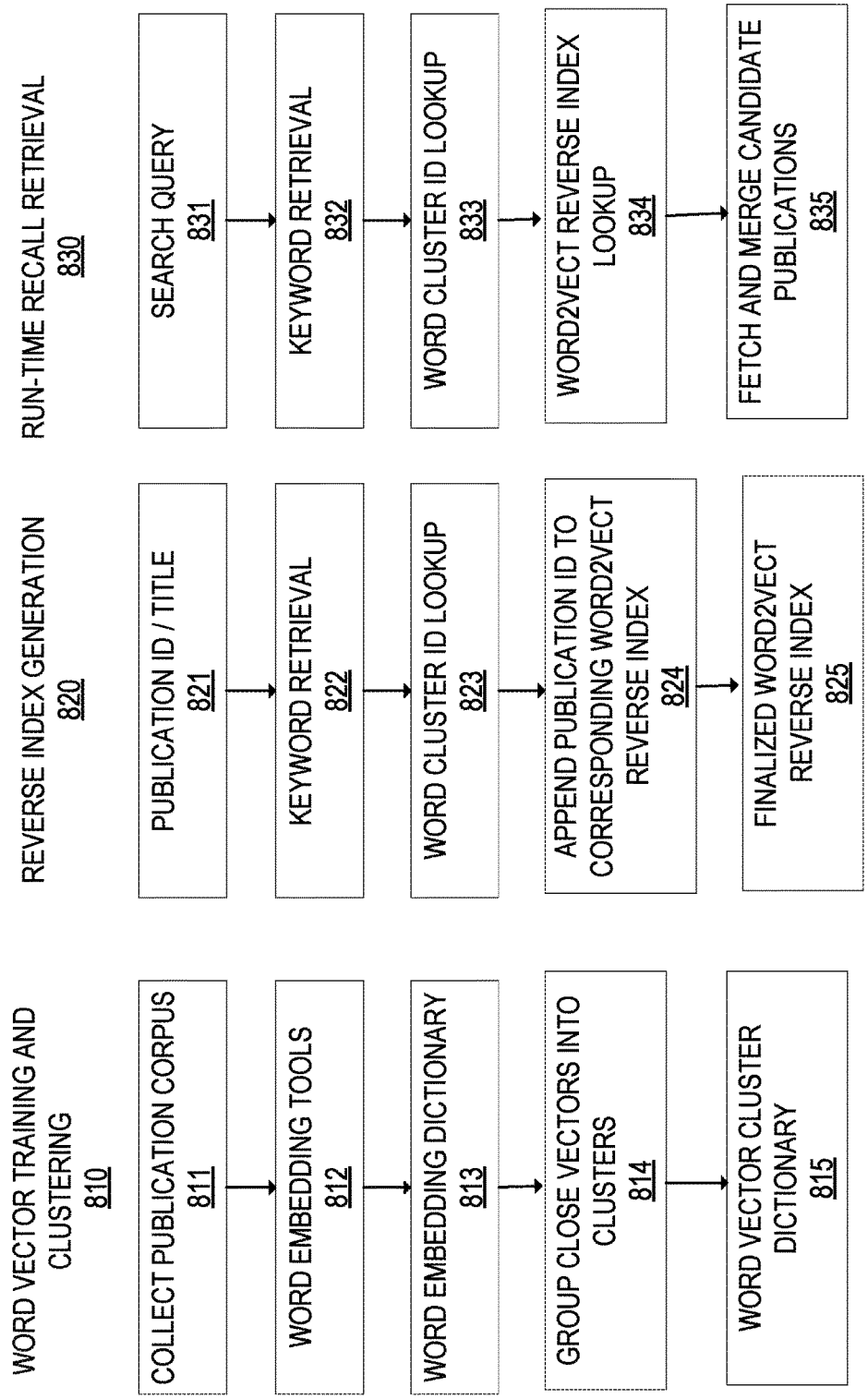
FIG. 8 illustrates a more detailed version of the block diagram FIG. 7 of a method for making and using a reverse semantic search index to find closest matches in a publication corpus in response to a user search.

FIG. 8 illustrates a more detailed version of the block diagram FIG. 7 of making and using a reverse semantic search index to find closest matches in a publication corpus in response to a user search. The block diagram has primary components of word semantic vector training and clustering 810, reverse index generation 820, and run-time recall retrieval 830. Each primary block is discussed in turn.

In the beginning of semantic vector training and clustering 810, a publication corpus is collected 811. A Word2Vec or other tool performs word embedding 812 for every keyword entry in the vocabularies within the search query corpus and publication title corpus to make a word embedding dictionary 813. Clustering technology such as k-means clustering groups those word semantic vectors into a finite number of clusters based on their distance to each other 814. The result is a word vector cluster dictionary 815.

In the beginning of reverse index generation 820, publication IDs are accessed 821, and keywords are extracted from the publication 822. For each keyword in the publication title, the encoding word vector value and is accessed and then the cluster ID is accessed 823. The publication ID is added to that cluster ID 824. After all keywords are processed, the word2vec reverse index is finalized 825.

For example, publication ID 12345 has a title of: "red athletic shoes" with keywords: red, athletic, and shoes. The encoding word vector clusterIDs are C1, C5, and C5. Thus, a word2vec reverse-index includes:
C1: 12345, . . . (other PublicationIDs containing a word vector belonging to C1 cluster)

C5: 12345, . . . (other PublicationIDs containing a word vector belonging to C5 cluster)

In the beginning of run-time recall retrieval 830, at search run-time, a search query is received 831. Keywords are extracted from the search query 832. The encoding word vector value and its cluster ID are accessed for each keyword 833. The clusterID is used to access PublicationIDs of publications 834, and the candidate publications are merged 835.

For example, a search query is "red running shoe" with keywords red, running, and shoe. The encoding word vector cluster IDs are: C1, C5 and C5. The publications are retrieved from in the reverse index for clusterID entries C1 and C5. The resulting PublicationIDs (and any others belonging to cluster IDs C1 and C5) are retrieved and merged.

Figure 9:
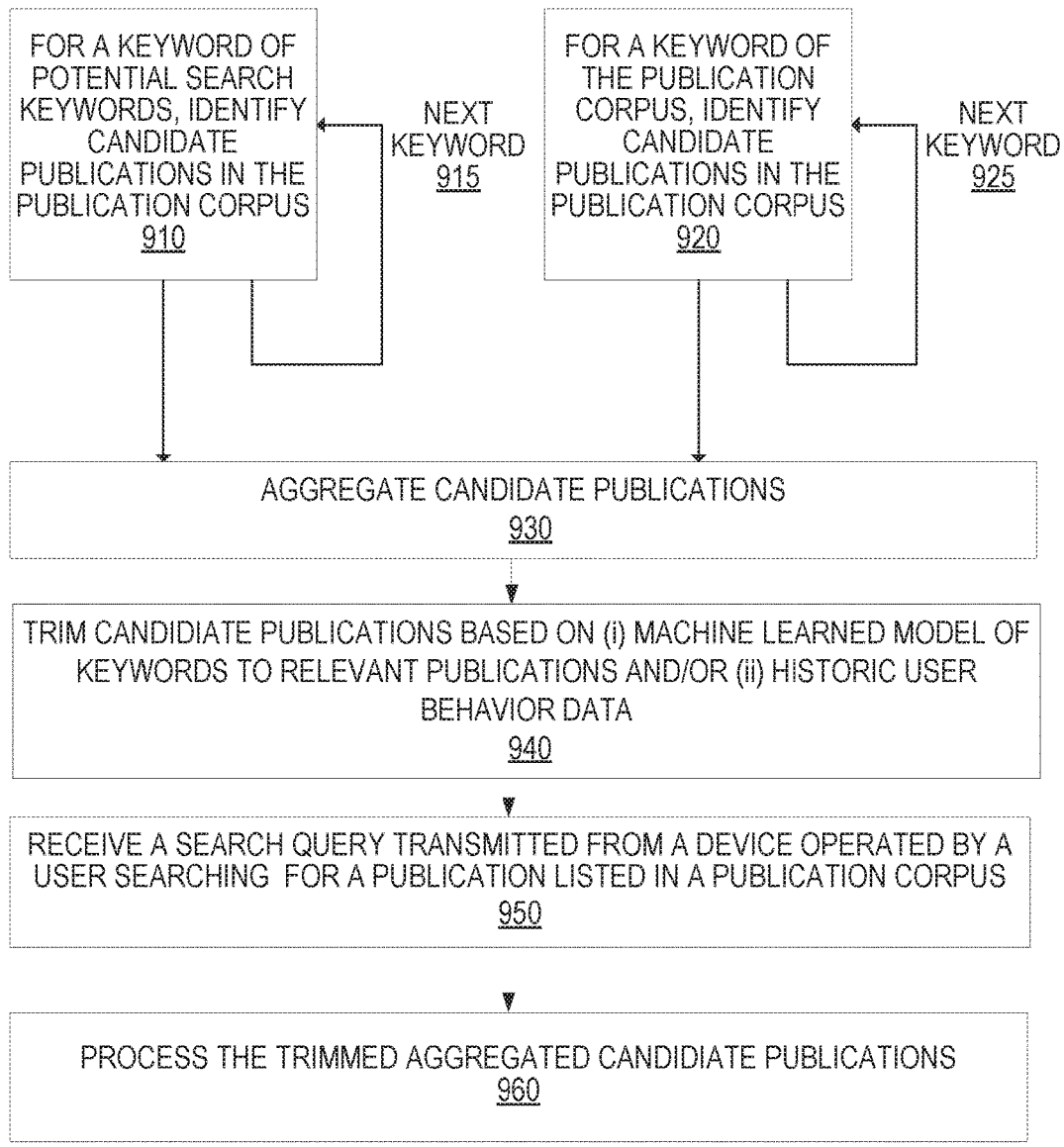
FIG. 9 illustrates a flow diagram of a method for trimming candidate publications to improve efficiency of finding closest matches in a publication corpus in response to a user search.

FIG. 9 illustrates a flow diagram of a method for trimming candidate publications to improve the efficiency of finding closest matches in a publication corpus in response to a user search.

At operation 910, for a keyword among potential search keywords, candidate publications are identified in the publication corpus. At operation 915, this is iterated for other keywords among potential search keywords.

At operation 920, for a keyword among the publication corpus, candidate publications are identified in the publication corpus. At operation 925, this is iterated for other keywords among potential search keywords.

At operation 930, the candidate publications are aggregated from operations 910 and 920. At operation 940, candidate publications are trimmed, based on (i) machine-learned model of keywords to relevant publications or (ii) historic user behavior such as purchase, selection, and/or mouse or other control signal. Such trimming may occur offline.

At operation 950, a search query is received from a device operated by a user searching for a publication listed in a publication corpus. At operation 960, responsive to the search query, the trimmed aggregated candidate publications are processed for closest matches with the search query. Because of the trimming, finding matches with the search query among the publications is faster.

Figure 10:
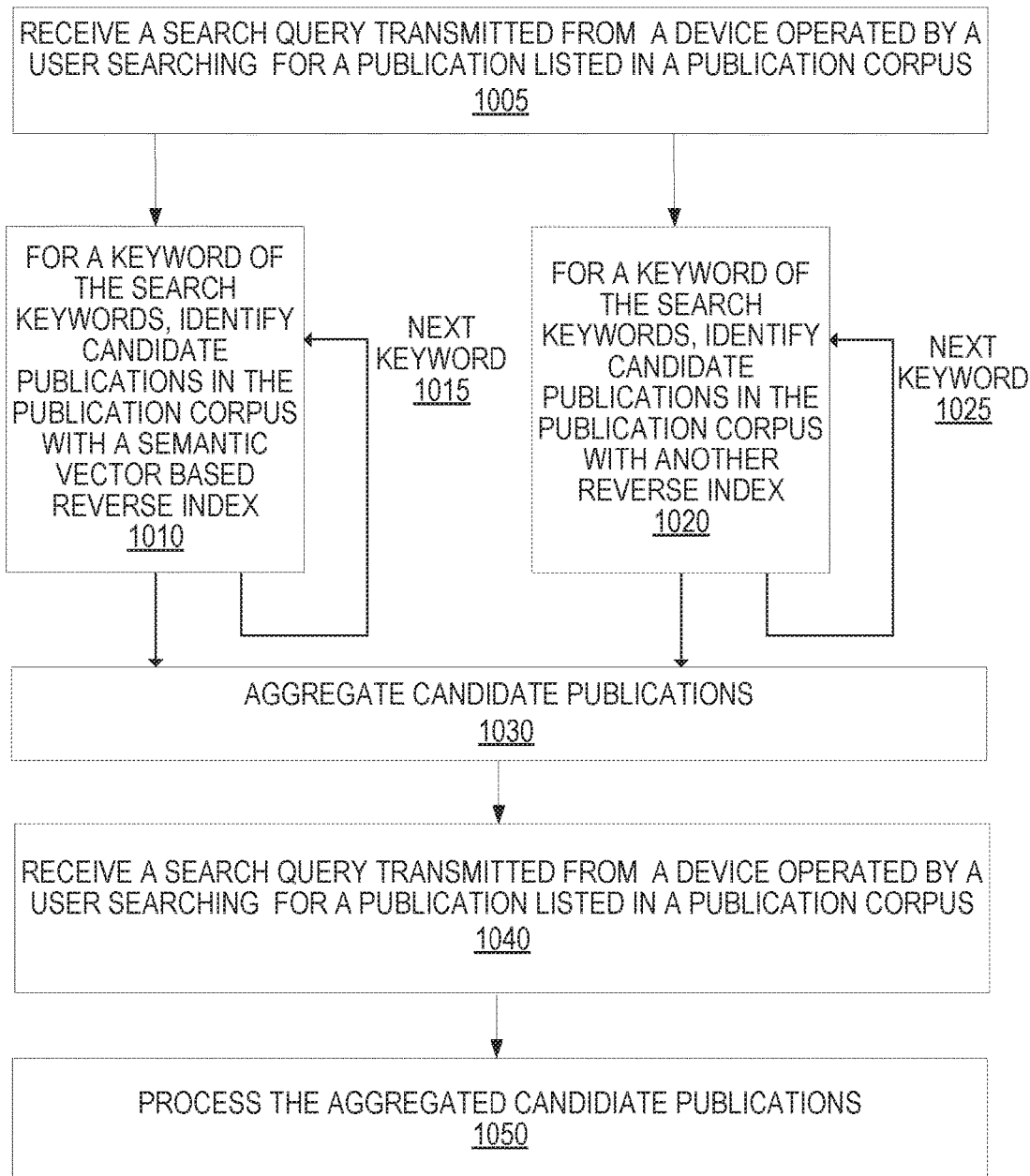
FIG. 10 illustrates a flow diagram of a method for using multiple types of reverse indexes to more comprehensively find closest matches in a publication corpus in response to a user search.

FIG. 10 illustrates a flow diagram of a method for using multiple types of reverse indexes to more comprehensively find closest matches in a publication corpus in response to a user search.

At operation 1005, a search query is received which was received from a device operated by a user searching for a publication listed in a publication corpus.

At operation 1010, for a keyword among potential search keywords, candidate publications are identified in the publication corpus with a semantic vector-based reverse index. At operation 1015, this is iterated for other keywords among potential search keywords.

At operation 1020, for a keyword among potential search keywords, candidate publications are identified in the publication corpus with another reverse index. At operation 1025, this is iterated for other keywords among potential search keywords.

At operation 1030, candidate publications are aggregated from operations 1010 and 1020. At operation 1040, a search query is received from a device operated by a user searching for a publication listed in a publication corpus. At operation 1050, in response to the search query, the aggregated candidate publications are processed for closest matches with the search query. Because of the multiple indexes of different types, the search results are more comprehensive.

Other example indexes comprise:
(i) N-gram based which is inclusive in what is indexed, but in some embodiments does not retain semantic meaning.
(ii) Name entity based which has more structure than N-gram, but in some embodiments does not understand semantic meaning.
(iii) Head query based memorization which saves time and is accurate due to the system relying on prior input from the user device. However, because head query based memorization is based on prior input from the user device, head query based memorization has limited coverage, is less adaptive, and does not cover new publications or new publication types that have not been the subject of prior input from the user device.
(iv A variant of (iii) where and index of head to relevant publications are pre-populated and updated near-real-time.

Figure 11:
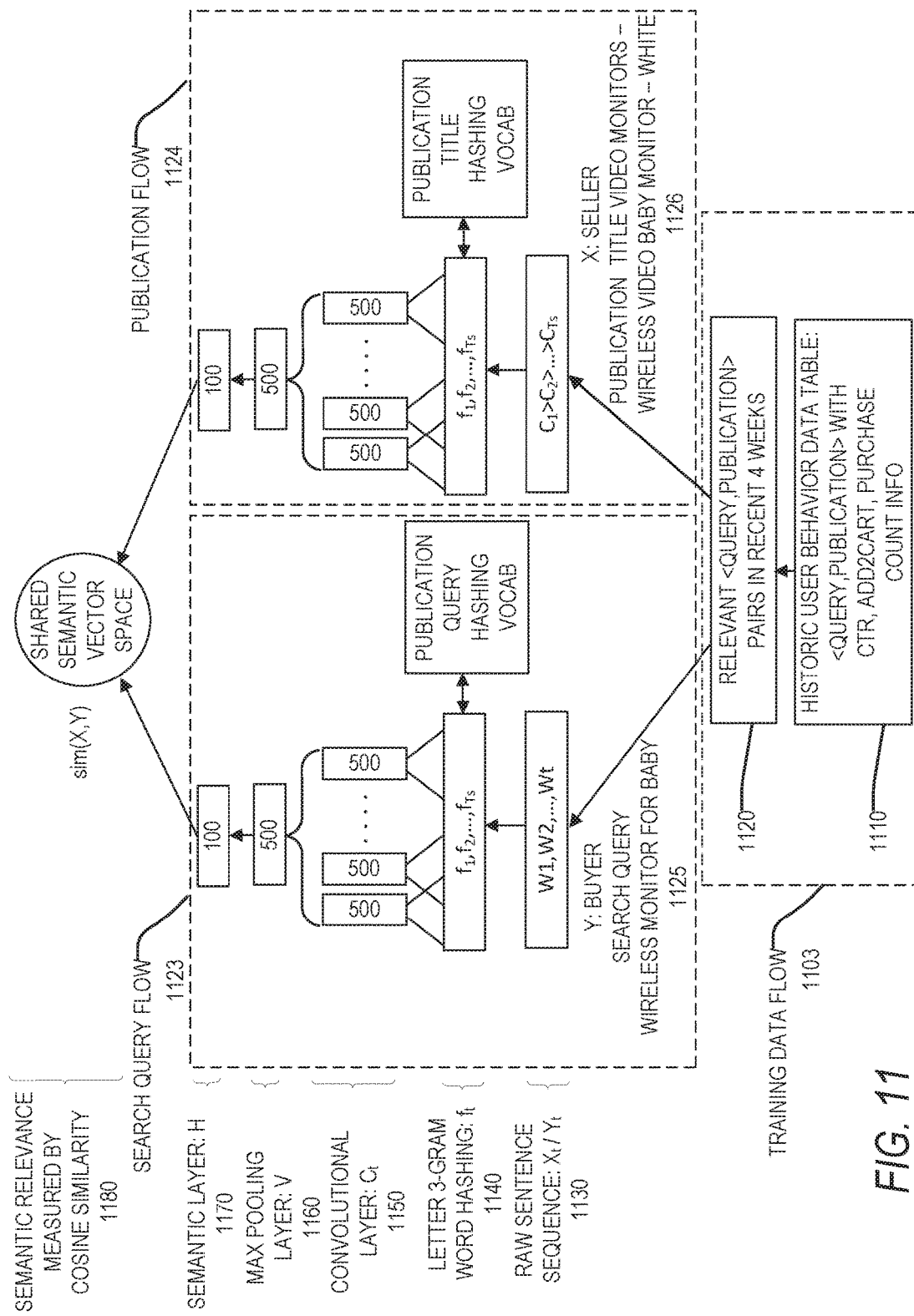
FIG. 11 illustrates an offline training process for search based on semantic vectorization.

FIG. 11 illustrates an offline training process for search based on semantic vectorization.

Referring to FIG. 11, the source machine-learned model and the target machine-learned model are trained. In a bottom portion, training data flow 1103 accesses training data. In a left column, a search query flow 1123 trains the machine-learned model for search queries. In a right column a publication flow 1124 trains the machine-learned model for publications. Labeled training data pairs (e.g., search query, publication) are provided for training both the first machine-learned model and the second machine-learned model.

In the bottom portion for the training data flow 1103, training data is accessed. In 1110, a historic user behavior data table is accessed, which has <query, publication> value pairs. The historic user behavior data table may include data such as impression count, click count, watch count, adding to purchase cart count, and purchase count.

In 1120, out of the <query, publication> value pairs from the historic user behavior data table, relevant pairs are accessed from a pre-determined or selectable time period (e.g., the last 4 weeks).

In the left column for the search query flow 1122, the search query (Y) is received, shown as an example query 1125 of a user search query of a wireless baby monitor. Word hashing is performed on the search query (Y) with a raw sentence sequence 1130. In situations where there is a very large vocabulary word, hashing is performed on a sub-word unit. In various embodiments, in 1140 letter 3-gram word hashing is performed.

In the search query flow 1123, a deep neural network (DNN) is used to extract semantic vector representations of the search query (Y). The DNN uses more than one neural network layer to project input sequences into a semantic vector space. In an example embodiment, a convolution layer 1150, a maximum pooling layer 1160, and a semantic layer 1170 represent neural network layers. Some embodiments also have a binary classifier converting a floating point vector in to a binary representation. A number of nodes (e.g., 100 nodes, 500 nodes, and multiple groups of 500 nodes as shown) may be configured in those neural network layers. In other embodiments, the number of nodes may be changed or configured to a different number, depending on the data size. Keywords and concepts are identified from the search query (Y) using convolution and max-pooling.

In the right column for the publication flow 1124, a publication (X) is received, shown as an example publication 1126 with a seller publication title of video monitors or a white wireless video baby monitor. For an example embodiment, a publication system is used to list publications and may include millions of publications including example publication 1126. Word hashing may be performed on the target publication with a raw sentence sequence 1130. In situations where there is a very large vocabulary word, hashing is performed on a sub-word unit. In various embodiments, in 1140 letter 3-gram word hashing is performed.

In the publication flow 1124, a deep neural network (DNN) is used to extract semantic vectors representations of the target publication (X). The DNN uses more than one neural network layer to project input sequences into a semantic vector space. In an example embodiment, the convolution layer 1150, the maximum pooling layer 1160, and the semantic layer 1170 represent neural network layers. Some embodiments also have a binary classifier converting the floating point vector into a binary representation. A number of nodes (e.g., 100 nodes, 500 nodes, and multiple groups of 500 nodes) may be configured in those neural network layers. In other embodiments, the number of nodes may be changed or configured to a different number, depending on the data size. Keywords and concepts are identified from the target publication (X) using convolution and max-pooling.

Finally, at 1180 semantic vector distance between X and Y is used to measure the similarity between the semantic vectors representations of the search query (Y) and the semantic vector representations of publications (X). In an example embodiment, the semantic relevance, represented by the function sim (X, Y), is measured by cosine similarity. In an embodiment with binary representations of the semantic vectors, XOR operations are performed.

When both the source machine-learned model and the target machine-learned model are trained, the semantic vector representations for all of the search query entries can be pre-computed in advance using the machine-learned model. Additionally, when there is a need to map any new publication from a seller, the semantic vector representation of the publication can be projected into shared semantic vector space with the semantic vectors representations of the publication.

As indicated above, when the machine-learned model is applied to mapping a specific <source sequence, target sequence> pair, the parameters for machine-learned Source Model and machine-learned Target Model are optimized so that relevant <source, target> pair has closer vector representation distance. The following formula can be used to compute the minimum distance.

$$SrcMod^*, TgtMod^* = \operatorname{argmin} \sum_{k \text{ in all training pairs}} \|SrcVec^k - TgtVec^k\|$$

Where,
ScrSeq=a source sequence;
TgtSeq=a target sequence;
SrcMod=source machine-learned model;
TgtMod=target machine-learned model;
SrcVec=a continuous vector representation for a source sequence (also referred to the semantic vector of the source); and
TgtVec=a continuous vector representation for a target sequence (also referred to as semantic vector of the target).

The source machine-learned model encodes the source sequence into a continuous vector representation. The target machine-learned model encodes the target sequences into a continuous vector representations. In an example embodiment, the vectors each have approximately 100 dimensions. Alternatively, XOR operations can be performed on the binary representations of the semantic search vector and the publication vectors.

The results of the training process are two optimized neural network models—one the query model, another the publicationTitle model).

When a relevant pair of <query, publicationTitle> is input to the <query_model, publicationTitle_model> respectively, the inferenced semantic vector pair <query_semantic_vector, publicationTitle_semantic_vector> will have a closer distance.

When a non-relevant: pair of <query, publicationTitle> is input to the <query_model, publicationTitle_model> respectively, the inferenced semantic vector pair <query_semantic_vector, publicationTitle_semantic_vector> will have a larger distance.

Figure 12:
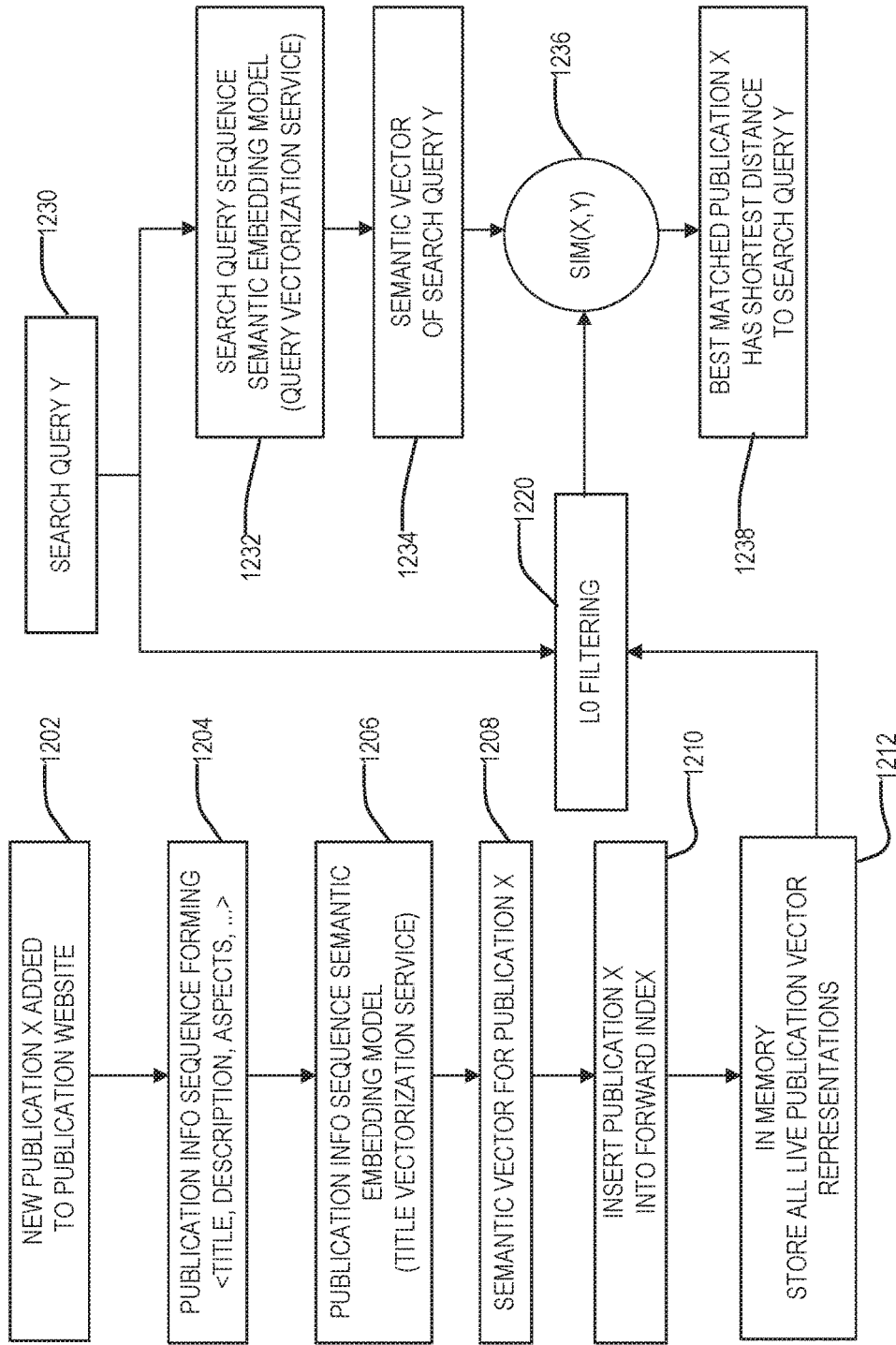
FIG. 12 illustrates a runtime search process for search based on semantic vectorization.

FIG. 12 illustrates a runtime search process for search based on semantic vectorization. The left column is directed to the addition of a publication to the publication corpus. The right column is directed to searching for a publication in a publication corpus, in response to a search query transmitted from a device operated by a user.

Addition of a publication to the publication corpus is covered generally at 1202 to 1212. At 1202, a new publication X is added to the publication website or other storage. At 1204, the information of the new publication X is parsed into its components, such as title, description, and aspects. At 1206, sequence semantic embedding (SSE) encodes publication titles (e.g., title keywords for publications being listed) and category tree paths into semantic vector representations as <source sequence, target sequence> pairs. In various embodiments, SSE is used to encode a sequence of symbols (e.g., a phrase, a sentence or a paragraph) into a continuous, dimensional vector space where semantic level similar sequences will have closer representation in this semantic vector space. This SSE approach can automatically capture the deep latent semantic meaning of a publication title and project its semantic level meaning into a shared multi-dimensional vector space.

At 1208, a semantic vector is generated for publication X, applying the SSE approach to the remainder of publication X, such as the description and aspects. At 1210, publication X is inserted into one or more forward indexes. At 1212, all live publication vectors are stored in memory to reduce access times.

Searching for a publication in a publication corpus, in response to a search query transmitted from a device operated by a user, is generally covered at 1230 to 1242. At 1230, a search query Y is received from a user device. At 1232, sequence semantic embedding (SSE) query elements into semantic vector representations as <source sequence, target sequence> pairs. At 1234, a semantic vector is generated for search query Y, applying the SSE approach to the search query Y.

At 1220, L0 filtering is performed using both candidate publications X from and on search query Y. L0 filtering is shown in more detail at FIG. 13. At 1236, semantic vector distance between X and Y is used to measure the similarity between the semantic vectors representations of the search query (Y) and the semantic vector representations of publications (X). In an example embodiment, the semantic relevance, represented by the function sim (X, Y), is measured by cosine similarity. In an embodiment with binary representations of the semantic vectors, XOR operations are performed.

At 1238, the best matched publication X to the search query Y is identified, according to the shortest distance in semantic space between semantic vectors of candidate publications X and the semantic vector of search query Y.

Certain publication updates impact the search index. The resulting search index update is performed similarly to a removal and a subsequent addition.

Figure 13:
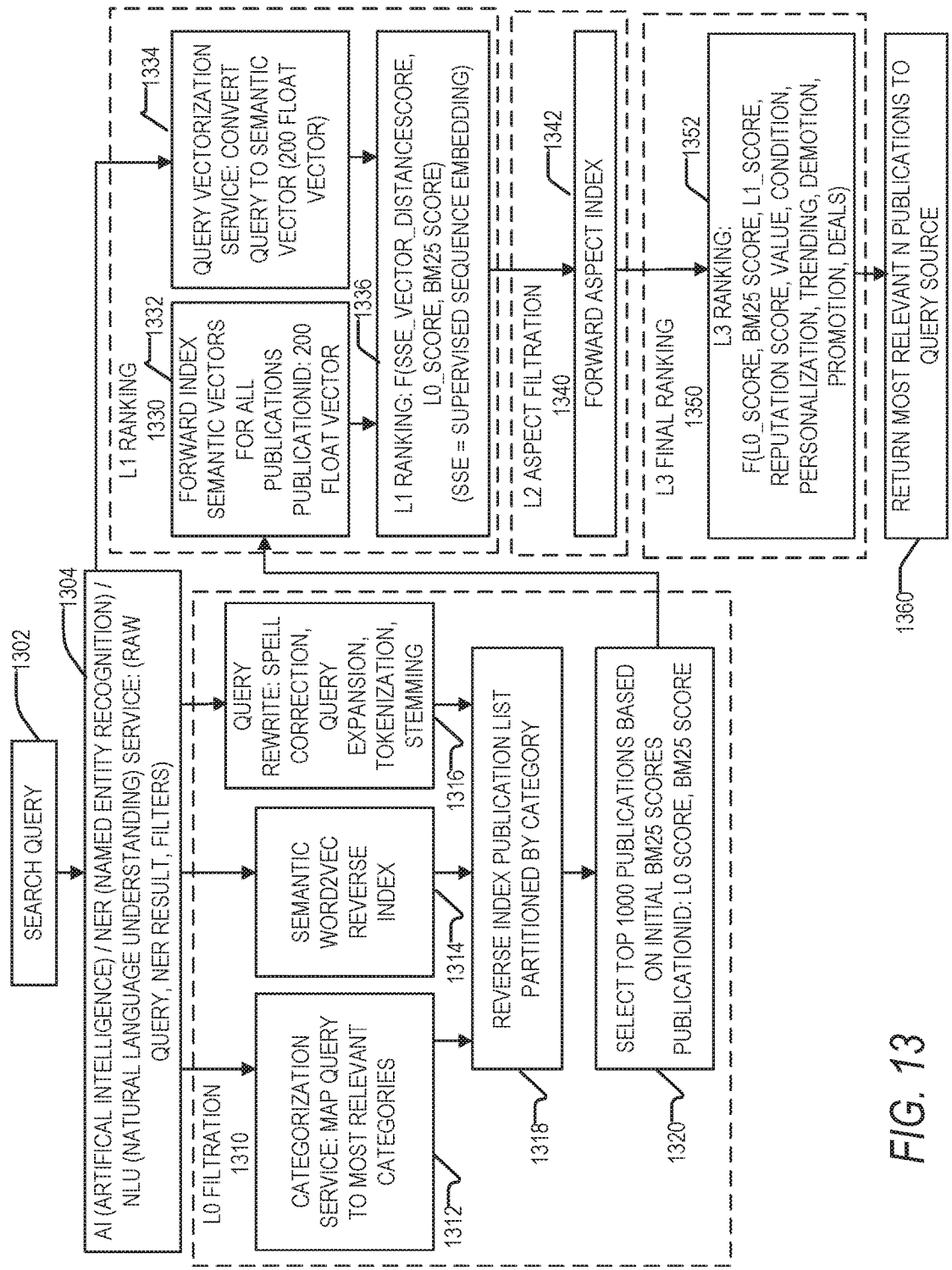
FIG. 13 illustrates a query to publication retrieval process where multiple levels of relevance filtration/ranking are performed.

FIG. 13 illustrates a query to publication retrieval process where multiple levels of relevance filtration/ranking are performed.

At 1302, a search query is received from a user device. At 1304, the search query is processed according to one or more algorithms, such as artificial intelligence (AI), named entity recognition (NER), or natural language understanding (NLU).

At 1310, L0 filtration is performed. Responsive to the processed search query from 1304, various components assist with gathering candidate publications to match against the search query.

At 1312, semantic vector category mapping maps a search query to most relevant categories. Similar publications are placed in the same category. For example, a cellphone is listed under the "smartphone" category; while a book is listed under the "book" category. By applying the categorization block, search engine performance is much faster and returns more relevant results to the user. For example, if a user search query is "Smartphone X development," without applying the categorization block, the search engine can search against a large quantity 600 million+) of publications for those keywords and might return some publications that are "Smartphone X" instead of a book about "Smartphone X development." After applying categorization, the "Category classification" block knows that this search query is about a book, and thus guides the search engine to only search a small quantity (e.g., around 100K) of publications under the book category for those keywords and return more relevant publications about the books of "Smartphone X development." This block thus significantly improves search engine's speed and accuracy.

At 1314, a semantic word2vector index is applied to a reverse semantic search index to extend query expansion. By adding search words that are semantically related to query words, the recall set of candidate publications is increased.

At 1316, query rewrite increases a search engine's recall set by capturing as many synonyms as possible. For example, if a search query is "sneakers for men" and a publication has a publication title of "running shoes," then without query rewrite, the publication will not be returned to the user because the publication title does not contain any keywords in the search query. So a synonym dictionary captures synonyms for keywords. For example, "sneakers," "running shoes," and "athletic shoes" are in a same synonym dictionary entry as having the same semantic meaning. "Query Rewrite" re-writes/expands the raw search query into multiple possible search queries according to the synonym dictionary. For example, the "sneakers for men" is rewritten/expanded into three search queries: "sneakers for men," "running shoes for men," "athletic shoes for men." The search engine returns publications which match with any of these rewrittten/expanded search queries. By applying this "Query Rewrite" block, a publication with the publication title "running shoes" is returned to user even if its title does not contain any keywords in the raw search query.

At 1318, candidate publications are gathered into a reverse index publication list partitioned by category. The reverse index is generated from categorization service 1312, semantic word2vec reverse index 1314, and query rewrite 1316. At 1320, a top number (e.g., top 1000) of candidate publications are selected from the reverse index of 1318. A publication has a publicationID, an L0 score, and a BM25 score. The ranking is based on, for example, L0 score and BM25 score.

L1 ranking 1330 is performed after L0 filtration 1310. At 1332, a forward index is generated of semantic vectors for the candidate publications from 1320. The semantic vector mapping assists with mapping a query to a title at the sentence level and with ranking. In the semantic vector forward-index case of a collection of key-value pairs, the "key" is the PublicationID of the publication, and the "value" is the semantic vector. Examples with a limited number of semantic vector dimensions are:

Publication123: [0.2, 1.5, −3.2]
Publication456: [0.5, 3.2, −2.1]

In one example, the semantic vector is a 200 bit floating point vector. Other examples have a different number of bits, and/or different representations such as fixed point. In one example, the semantic vector is generated from the machine learned model trained in the publication flow 1124 of FIG. 11. At 1334, the query from 1304 is vectorized for comparison with the publication semantic vectors. In one example, the semantic vector is a 200 bit floating point vector. Other examples have a different number of bits, and/or different representations such as fixed point. In one example, the semantic vector is generated from the machine learned model trained in the search query flow 1123 of FIG. 11.

L2 aspect filtration 1340 is performed after L1 ranking 1330. At 1342, a forward aspect index 1342 extends beyond aspects provide by seller to find the most relevant candidate publications. Additional aspects are found from the publication via NER (name entity recognition).

In the publication aspect forward-index case of a collection of key-value pairs, the "key" is the PublicationID, and the "value" is some aspect associated with the publication. An example is:

Publication123: [color_red, type_shoes, brand_shoebrand, . . . ]

L3 final ranking 1350 is performed after L2 aspect filtration 1340. The L3 ranking module 1352 is a machine-learned model that takes inputs such as historic user behavior data, L0 score, BM25 score, L1 score, reputation score, value, publication condition, user profile, session context, and demotion signal. Finally, at 1360, the most relevant N publications are returned to the user device, based on L3 ranking 1350.

Figure 14:
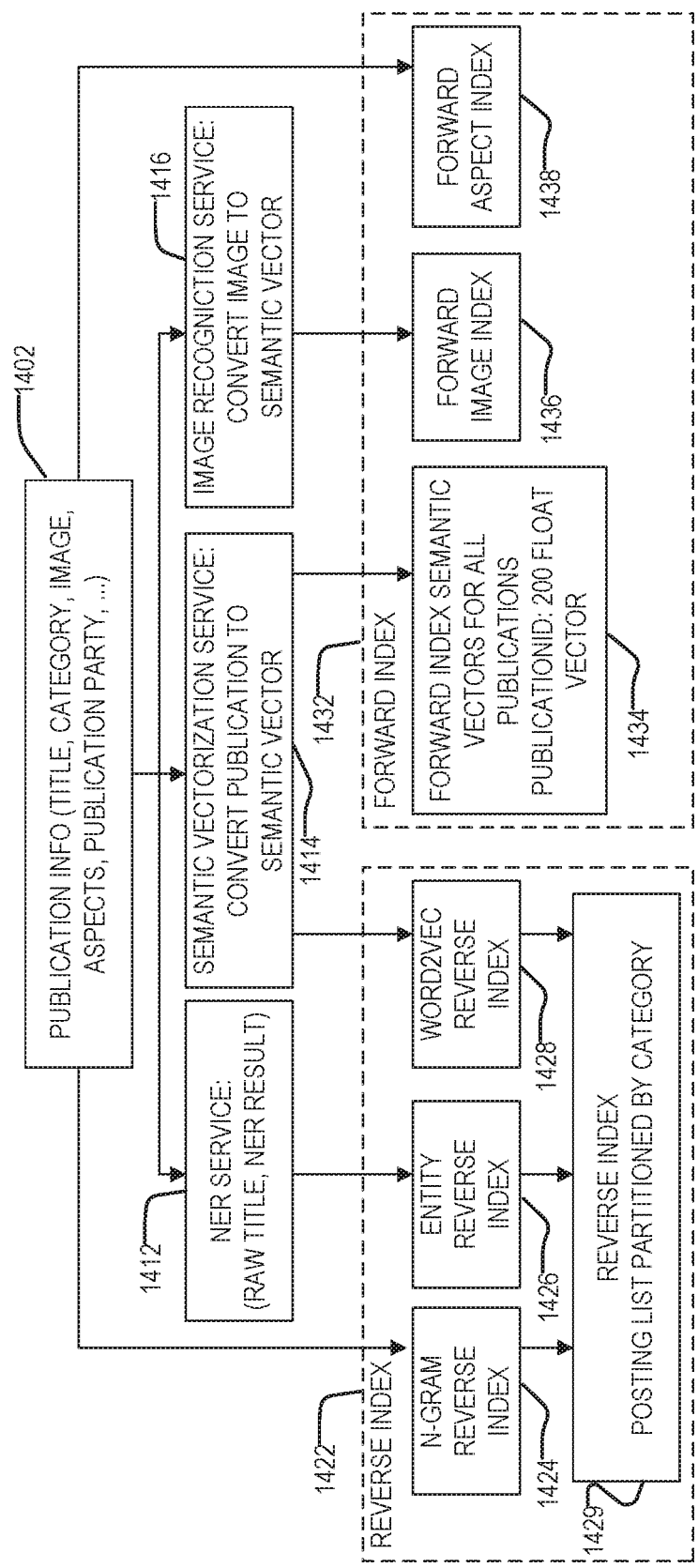
FIG. 14 is a block diagram illustrating a process of generating semantic forward and reverse indexes.

FIG. 14 is a block diagram illustrating the process of generating, from the publications, semantic forward and reverse indexes used in connection with other figures. The forward indexes have key-value pairs with the PublicationID as the key. The reverse indexes have key-value pairs with the PublicationID as the value.

The semantic forward and reverse indexes originate from data of publications of a publication corpus 1402, such as title, category, images, aspects, publication party such as a seller, etc. The publication data 1402 is processed by a NER (name entity recognition service) 1412 that extracts from publication entities information such as color, brand, type; an image recognition service 1416 that converts images to semantic vectors and text; and a semantic vectorization service 1414 that converts publications to a semantic vector.

Reverse indexes 1422 of collections of key-value pairs include:

(i) N-gram reverse index 1424 where the "key" is the keyword, and the value is a list of PublicationIDs of publications containing this keyword. A simple example with the keyword "red" is:

red: [publication123, publication456, . . . ]

(ii) Entity-reverse index 1426 where the "key" is the entity word, and the value is a list of PublicationIDs containing of publications this entity word. A simple example with an aspect of the publication is:

type shoes: [publication123, publication456, . . . ]

(iii) Word2Vec-reverse index 1428 where the "key" is the word vector's clusterID, and the value is a list of PublicationIDs which contain a keyword whose word-vector is this clusterID. A simple example is:

word_vector_cluster#123: [publication342, publication456, . . . . ]

Reverse index 1429 combines n-gram reverse index 1424, entity-reverse index 1426, and word2Vec-reverse index 1428. Reverse index 1429 is partitioned by publication category.

The forward indexes 1432 of collections of key-value pairs include:

(i) Forward semantic vector index 134 for publications in the publication corpus. Each publication in the publication corpus is represented by a semantic vector, such a vector of 200 bit floating point value.

(ii) Forward image index 1436 derived from publication images.

(iii) Forward aspect index 1438 derived from publication aspects.

Example Machine Architecture and Machine-Readable Medium

Figure 15:
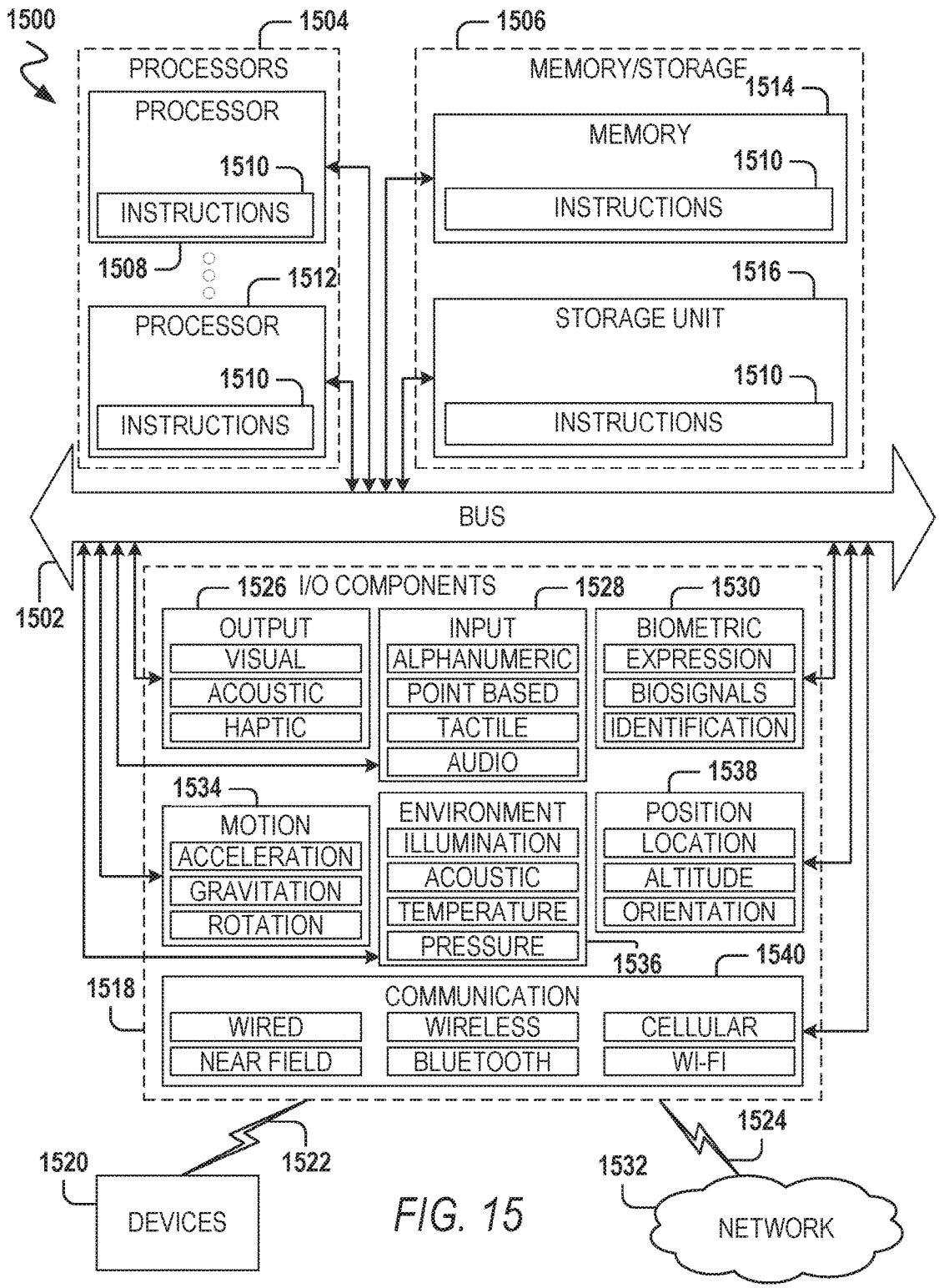
FIG. 15 is a block diagram illustrating an example of a software architecture that may be installed on a machine, according to some example embodiments.

FIG. 15 is a block diagram illustrating components of a machine 1500, according to some example embodiments, able to read instructions from a machine-readable medium (e.g., a machine-readable storage medium) and perform any one or more of the methodologies discussed herein. Specifically, FIG. 15 shows a diagrammatic representation of the machine 1500 in the example form of a computer system, within which instructions 1510 (e.g., software, a program, an application, an applet, an app, or other executable code) for causing the machine 1500 to perform any one or more of the methodologies discussed herein may be executed. For example, the instructions 1510 may cause the machine 1500 to execute the flow diagrams of FIGS. 5-10. Additionally, or alternatively, the instructions 1510 may implement the servers associated with the services and components of the FIGS. 1-14, and so forth. The instructions 1510 transform the general, non-programmed machine 1500 into a particular machine 1500 programmed to carry out the described and illustrated functions in the manner described.

In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a switch, a controller, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1510, sequentially or otherwise, that specify actions to be taken by the machine 1500. Further, while only a single machine 1500 is illustrated, the term "machine" shall also be taken to include a collection of machines 1500 that individually or jointly execute the instructions 1510 to perform any one or more of the methodologies discussed herein.

The machine 1500 may include processors 1504, memory/storage 1506, and I/O components 1518, which may be configured to communicate with each other such as via a bus 1502. In an example embodiment, the processors 1504 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1508 and a processor 1512 that may execute the instructions 1510. The term "processor" is intended to include multi-core processors that may comprise two or more independent processors (sometimes referred to as "cores") that may execute instructions contemporaneously. Although FIG. 15 shows multiple processors 1504, the machine 1500 may include a single processor with a single core, a single processor with multiple cores (e.g., a multi-core processor), multiple processors with a single core, multiple processors with multiples cores, or any combination thereof.

The memory/storage 1506 may include a memory 1514, such as a main memory, or other memory storage, and a storage unit 1516, both accessible to the processors 1504 such as via the bus 1502. The storage unit 1516 and memory 1514 store the instructions 1510 embodying any one or more of the methodologies or functions described herein. The instructions 1510 may also reside, completely or partially, within the memory 1514, within the storage unit 1516, within at least one of the processors 1504 (e.g., within the processor's cache memory), or any suitable combination thereof, during execution thereof by the machine 1500. Accordingly, the memory 1514, the storage unit 1516, and the memory of the processors 1504 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1510. The term "machine-readable medium" shall also be taken to include any medium, or combination of multiple media, that is capable of storing instructions (e.g., instructions 1510) for execution by a machine (e.g., machine 1500), such that the instructions, when executed by one or more processors of the machine (e.g., processors 1504), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1518 may include a wide variety of components to receive input, provide output, produce output, transmit information, exchange information, capture measurements, and so on. The specific I/O components 1518 that are included in a particular machine will depend on the type of machine. For example, portable machines such as mobile phones will likely include a touch input device or other such input mechanisms, while a headless server machine will likely not include such a touch input device. It will be appreciated that the I/O components 1518 may include many other components that are not shown in FIG. 15. The I/O components 1518 are grouped according to functionality merely for simplifying the following discussion, and the grouping is in no way limiting. In various example embodiments, the I/O components 1518 may include output components 1526 and input components 1528. The output components 1526 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1528 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1518 may include biometric components 1530, motion components 1534, environmental components 1536, or position components 1538 among a wide array of other components. For example, the biometric components 1530 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1534 may include acceleration sensor components (e.g., accelerometer), gravitation sensor components, rotation sensor components (e.g., gyroscope), and so forth. The environmental components 1536 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1538 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1518 may include communication components 1540 operable to couple the machine 1500 to a network 1532 or devices 1520 via a coupling 1524 and a coupling 1522, respectively. For example, the communication components 1540 may include a network interface component or other suitable device to interface with the network 1532. In further examples, the communication components 1540 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1520 may be another machine or any of a wide variety of peripheral devices (e.g., a peripheral device coupled via a USB).

Moreover, the communication components 1540 may detect identifiers or include components operable to detect identifiers. For example, the communication components 1540 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1540, such as location via Internet Protocol (IP) geo-location, location via Wi-Fi® signal triangulation, location via detecting an NFC beacon signal that may indicate a particular location, and so forth.

In various example embodiments, one or more portions of the network 1532 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1532 or a portion of the network 1532 may include a wireless or cellular network and the coupling 1524 may be a Code Division Multiple Access (CDMA) connection, a Global System for Mobile communications (GSM) connection, or another type of cellular or wireless coupling. In this example, the coupling 1524 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1510 may be transmitted or received over the network 1532 using a transmission medium via a network interface device (e.g., a network interface component included in the communication components 1540) and utilizing any one of a number of well-known transfer protocols (e.g., hypertext transfer protocol (HTTP)). Similarly, the instructions 1510 may be transmitted or received using a transmission medium via the coupling 1522 (e.g., a peer-to-peer coupling) to the devices 1520. The term "transmission medium" shall be taken to include any intangible medium that is capable of storing, encoding, or carrying the instructions 1510 for execution by the machine 1500, and includes digital or analog communications signals or other intangible media to facilitate communication of such software.

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

The modules, methods, applications and so forth described herein are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   accessing, with one or more processors, a search query of a plurality of keywords originating from a user device, the search query searching for a relevant set of publications in a publication corpus;
   with at least one of the plurality of keywords of the search query encoded by a semantic vector in a semantic vector space, identifying, with the one or more processors and for each of at least two different keywords of the search query, a plurality of candidate publications in the publication corpus, the plurality of candidate publications encoded by a cluster of a plurality of semantic vectors in the semantic vector space, the identifying based on proximity in the semantic vector space between the at least one of the plurality of keywords of the search query and keywords in the plurality of candidate publications, the proximity based on a projection of the at least one of the plurality of keywords in the search query and the keywords in the plurality of candidate publications into the semantic vector space;
   accessing a first plurality of key-value pairs, each key-value pair of the first plurality of key-value pairs mapping a key of each key-value pair of the first plurality of key-value pairs to a value of each key-value pair of the first plurality of key-value pairs, the first plurality of key-value pairs mapping the at least one keyword to the respective cluster;
   accessing a second plurality of key-value pairs, each key-value pair of the second plurality of key-value pairs mapping a key of each key-value pair of the second plurality of key-value pairs to a value of each key-value pair of the second plurality of key-value pairs, the second plurality of key-value pairs mapping the respective cluster to the respective plurality of candidate publications in the publication corpus; and
   causing display, on the user device, of a list of the plurality of candidate publications as the relevant set of publications in the publication corpus.

2. The method of claim 1, further comprising:
   identifying one or more closest matches between (i) a search semantic vector that encodes at least one of the keywords of the search query, and (ii) the plurality of semantic vectors encoding keywords in a plurality of candidate publications in the publication corpus aggregated from the respective pluralities of candidate publications in the publication corpus.

3. The method of claim 1, further comprising:
   accessing a plurality of clusters of the plurality of word vectors, the plurality of clusters including the respective clusters, each cluster of the plurality of clusters grouping together the plurality of word vectors that are mutually proximate in the semantic vector space.

4. The method of claim 1, wherein the search query includes any of user profile data, session context data, and non-textual input that includes at least any of audio input, video input, or image input, and the identifying identifies a second plurality of candidate publications in the publication corpus such that the second plurality of candidate publications correspond to a second cluster of a plurality of semantic vectors based on proximity in the semantic vector space between the search query and the second cluster of a plurality of word vectors.

5. The method of claim 1, further comprising:
   after the causing the display, receiving a selection signal originating from the user device, the selection signal indicating a selection from the one or more of the plurality of candidate publications.

6. The method of claim 1, further comprising display, on the user device, of a list of the plurality of candidate publications as the relevant set of publications in the publication corpus.

7. A system comprising:
   one or more processors and executable instructions accessible on a computer-readable medium that, when executed by the one or more processors, configure the one or more processors to at least perform operations comprising:

accessing a search query of a plurality of keywords originating from a user device, the search query searching for a relevant set of publications in a publication corpus;

with at least one of the plurality of keywords of the search query encoded by a semantic vector in a semantic vector space, identifying, for each of at least two different keywords of the search query a plurality of candidate publications in the publication corpus, the plurality of candidate publications encoded by a cluster of a plurality of semantic vectors in a semantic vector space, the identifying based on proximity in the semantic vector space between the at least one of the plurality of keywords of the search query and keywords in the plurality of candidate publications, the proximity based on a projection of the at least one of the plurality of keywords in the search query and the keywords in the plurality of candidate publications into the semantic vector space;

accessing a first plurality of key-value pairs, each key-value pair of the first plurality of key-value pairs mapping a key of each key-value pair of the first plurality of key-value pairs to a value of each key-value pair of the first plurality of key-value pairs, the first plurality of key-value pairs mapping the at least one keyword to the respective cluster;

accessing a second plurality of key-value pairs, each key-value pair of the second plurality of key-value pairs mapping a key of each key-value pair of the second plurality of key-value pairs to a value of each key-value pair of the second plurality of key-value pairs, the second plurality of key-value pairs mapping the respective cluster to the respective plurality of candidate publications in the publication corpus; and causing display, on the user device, of a list of the plurality of candidate publications.

8. The system of claim 7, wherein the operations further comprise:
identifying one or more closest matches between (i) a search semantic vector that encodes at least one of the keywords of the search query, and (ii) the plurality of semantic vectors encoding keywords in a plurality of candidate publications in the publication corpus aggregated from the respective pluralities of candidate publications in the publication corpus.

9. The system of claim 7, wherein the operations further comprise:
accessing a plurality of clusters of the plurality of word vectors, the plurality of clusters including the respective clusters, each cluster of the plurality of clusters grouping together the plurality of word vectors that are mutually proximate in the semantic vector space;
accessing a first plurality of key-value pairs, each key-value pair of the first plurality of key-value pairs mapping a key of each key-value pair of the first plurality of key-value pairs to a value of each key-value pair of the first plurality of key-value pairs, the first plurality of key-value pairs mapping the at least one keyword to the respective cluster; and
accessing a second plurality of key-value pairs, each key-value pair of the second plurality of key-value pairs mapping a key of each key-value pair of the second plurality of key-value pairs to a value of each key-value pair of the second plurality of key-value pairs, the second plurality of key-value pairs mapping the respective cluster to the respective plurality of candidate publications in the publication corpus.

10. The system of claim 7, wherein the search query includes any of user profile data, session context data, and non-textual input that includes at least any of audio input, video input, or image input, and the identifying identifies a second plurality of candidate publications in the publication corpus such that the second plurality of candidate publications correspond to a second cluster of a plurality of semantic vectors based on proximity in the semantic vector space between the search query and the second cluster of a plurality of word vectors.

11. The system of claim 7, wherein the operations further comprise:
after the causing the display, receiving a selection signal originating from the user device, the selection signal indicating a selection from the one or more of the plurality of candidate publications.

12. A tangible machine-readable device storing instructions that, when executed by one or more processors of a machine, cause the machine to perform operations comprising:
accessing a search query of a plurality of keywords originating from a user device, the search query searching for a relevant set of publications in a publication corpus;
with at least one of the plurality of keywords of the search query encoded by a semantic vector in a semantic vector space, identifying, with the one or more processors and for each of at least two different keywords of the search query, a plurality of candidate publications in the publication corpus, the plurality of candidate publications encoded by a cluster of a plurality of semantic vectors in the semantic vector space, the identifying based on proximity in the semantic vector space between the at least one of the plurality of keywords in the search query and keywords in the plurality of candidate publications, the proximity based on a projection of the at least one of the plurality of keywords in the search query and the keywords in the plurality of candidate publications into the semantic vector space;
accessing a first plurality of key-value pairs, each key-value pair of the first plurality of key-value pairs mapping a key of each key-value pair of the first plurality of key-value pairs to a value of each key-value pair of the first plurality of key-value pairs, the first plurality of key-value pairs mapping the at least one keyword to the respective cluster;
accessing a second plurality of key-value pairs, each key-value pair of the second plurality of key-value pairs mapping a key of each key-value pair of the second plurality of key-value pairs to a value of each key-value pair of the second plurality of key-value pairs, the second plurality of key-value pairs mapping the respective cluster to the respective plurality of candidate publications in the publication corpus; and
causing display, on the user device, of a list of the plurality of candidate publications.

13. The tangible machine-readable device of claim 12, wherein the operations further comprise:
identifying one or more closest matches between (i) a search semantic vector that encodes at least one of the keywords of the search query, and (ii) the plurality of semantic vectors encoding keywords in a plurality of candidate publications in the publication corpus aggregated from the respective pluralities of candidate publications in the publication corpus.

14. The tangible machine-readable device of claim 12, wherein the operations further comprise:

accessing a plurality of clusters of the plurality of word vectors, the plurality of clusters including the respective clusters, each cluster of the plurality of clusters grouping together the plurality of word vectors that are mutually proximate in the semantic vector space;

accessing a first plurality of key-value pairs, each key-value pair of the first plurality of key-value pairs mapping a key of each key-value pair of the first plurality of key-value pairs to a value of each key-value pair of the first plurality of key-value pairs, the first plurality of key-value pairs mapping the at least one keyword to the respective cluster; and accessing a second plurality of key-value pairs, each key-value pair of the second plurality of key-value pairs mapping a key of each key-value pair of the second plurality of key-value pairs to a value of each key-value pair of the second plurality of key-value pairs, the second plurality of key-value pairs mapping the respective cluster to the respective plurality of candidate publications in the publication corpus.

15. The tangible machine-readable device of claim 12, wherein the search query includes any of user profile data, session context data, and non-textual input that includes at least any of audio input, video input, or image input, and the identifying identifies a second plurality of candidate publications in the publication corpus such that the second plurality of candidate publications correspond to a second cluster of a plurality of semantic vectors based on proximity in the semantic vector space between the non-textual input and the second cluster of a plurality of word vectors.

* * * * *

UNITED STATES PATENT AND TRADEMARK OFFICE
CERTIFICATE OF CORRECTION

PATENT NO. : 10,430,446 B2  
APPLICATION NO. : 15/439026  
DATED : October 1, 2019  
INVENTOR(S) : Mingkuan Liu et al.

Page 1 of 1

It is certified that error appears in the above-identified patent and that said Letters Patent is hereby corrected as shown below:

In the Claims

In Column 26, Line 40, in Claim 12, after "on" delete "a".

Signed and Sealed this
Twenty-seventh Day of October, 2020

Andrei Iancu
*Director of the United States Patent and Trademark Office*